(12) United States Patent
Gadau et al.

(10) Patent No.: US 10,794,300 B2
(45) Date of Patent: Oct. 6, 2020

(54) SYSTEM AND METHOD FOR VARIABLE COMPRESSION RATIO ENGINE

(71) Applicant: Ford Global Technologies, LLC, Dearborn, MI (US)

(72) Inventors: Fabian Gadau, Ann Arbor, MI (US); Christopher Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 16/019,293

(22) Filed: Jun. 26, 2018

(65) Prior Publication Data

US 2019/0390609 A1 Dec. 26, 2019

(51) Int. Cl.
| | |
|---|---|
| *F16D 49/12* | (2006.01) |
| *F02D 15/02* | (2006.01) |
| *B60W 10/06* | (2006.01) |
| *B60W 10/18* | (2012.01) |
| *B60W 10/10* | (2012.01) |
| *B60W 30/182* | (2020.01) |
| *F02B 75/04* | (2006.01) |
| *F16D 121/06* | (2012.01) |

(52) U.S. Cl.
CPC ............. *F02D 15/02* (2013.01); *B60W 10/06* (2013.01); *B60W 10/10* (2013.01); *B60W 10/18* (2013.01); *B60W 30/182* (2013.01); *F16D 49/12* (2013.01); *B60W 2510/06* (2013.01); *B60W 2710/06* (2013.01); *B60W 2710/1005* (2013.01); *B60W 2710/18* (2013.01); *F02B 75/045* (2013.01); *F02D 2200/101* (2013.01); *F02D 2200/1002* (2013.01); *F02D 2200/50* (2013.01); *F02D 2700/03* (2013.01); *F16D 2121/06* (2013.01)

(58) Field of Classification Search
CPC ................................. F02D 15/02; F16D 49/12
See application file for complete search history.

(56) References Cited

U.S. PATENT DOCUMENTS

| | | | |
|---|---|---|---|
| 7,681,538 B2 * | 3/2010 | Hiyoshi | F02B 75/048 123/48 B |
| 7,802,544 B2 | 9/2010 | Kamada | |
| 7,934,475 B2 | 5/2011 | Meintschel et al. | |

FOREIGN PATENT DOCUMENTS

| | | |
|---|---|---|
| DE | 102011017202 A1 | 10/2012 |
| JP | 2002317663 A | 10/2002 |
| JP | 2009085187 A | 4/2009 |
| JP | 2010151088 A | 7/2010 |

* cited by examiner

*Primary Examiner* — Derek D Knight
(74) *Attorney, Agent, or Firm* — Geoffrey Brumbaugh; McCoy Russell LLP

(57) ABSTRACT

Methods and systems are provided for maintaining a compression ratio of an engine via a brake and while disabling an electric current applied to an actuator of the associated variable compression ratio mechanism. A braking force applied via the brake on a compression ratio control shaft is varied before and during a compression ratio transition to move the control shaft at a desired velocity. Brake torque application is coordinated with motor torque from a VCR actuator and engine torque applied on the control shaft to enable a smooth CR transition.

19 Claims, 10 Drawing Sheets

| Operating condition | CRCS | VCR actuator | Band Brake | Band Brake Actuator | Solenoid valve |
|---|---|---|---|---|---|
| Engine start | Locked | Powered off | Closed | Powered off | Default position |
| Engine Idle | Locked | Powered off | Closed | Powered on | Default position |
| Transient | Movable | Powered on | Loose | Powered on | Opposite direction |
| CR in region δ | Movable | Powered off | Loose | Powered on | Opposite direction |
| CR outside region δ | Locked | Powered off | Closed | Powered off | Default position |

FIG. 9

SYSTEM AND METHOD FOR VARIABLE COMPRESSION RATIO ENGINE

FIELD

The present description relates generally to methods and systems for a variable compression ratio engine.

BACKGROUND/SUMMARY

The compression ratio (CR) of an internal combustion engine, which is a ratio of cylinder volume when a piston is at bottom-dead-center (BDC) relative to top-dead-center (TDC), is defined by cylinder geometry. A higher compression ratio typically correlates with higher thermal efficiency and engine fuel economy. Variable Compression Ratio (VCR) engines may mechanically vary the compression ratio of each cylinder between a high compression ratio (HCR) and a low compression ratio (LCR) setting. For example, by mechanical shifting the piston position in the bore so that it is closer or farther from the top of the bore (such via an eccentric coupled to the piston), the volume at TDC, and thereby the compression ratio setting, can be varied. The HCR setting may be selected at light to moderate loads (that is, during knock-free conditions) to take advantage of the higher thermal efficiency and the resulting improved fuel economy, and maintained until spark retard from early knock onset erodes the fuel economy benefit. Thereafter, the LCR setting may be selected, trading off thermal efficiency for combustion phasing efficiency. Continuously variable systems may adjust the compression ratio to variable values in-between the LCR and HCR settings to optimize combustion phasing and thermal efficiency at any operating condition.

One example of a VCR engine is shown by Kamada et al. in U.S. Pat. No. 7,802,544 wherein the piston and crankshaft are connected to each other via multiple links (there two). However, there may be operating conditions where the engine needs to be operated with a fixed compression ratio, such as during an engine start. Maintaining a position corresponding to the fixed compression ratio may require torque from the VCR actuator, which in turn requires a constant power to be drawn by the actuator. This can erode the fuel economy advantage of a VCR engine. During an engine start, the current required to maintain the fixed CR can add significant start-up current load on the engine, causing an engine stall. In addition, VCR engine component durability may be reduced by the constant torqueing.

In other examples, a VCR actuator may be configured with a braking mechanism that holds the VCR control shaft in a fixed position corresponding to the desired fixed CR setting. One example of such a brake mechanism coupled to a VCR control shaft is shown by Meintschel et al. in U.S. Pat. No. 7,934,475. Therein, the drive device for controlling the VCR actuator contains a coupling mechanism with an integrated brake function. House-mounted windings are energized to activate the brake function.

However, the inventors have recognized that a potential issue with such braking mechanisms is that it may be difficult to balance the conflicting needs of quickly transitioning between CR settings and maintaining a fixed CR setting. In particular, maintaining a fixed CR setting may require the braking function to be activated, and the control shaft to be locked into a position corresponding to the fixed CR setting. On the other hand, when the braking function is activated and the control shaft is locked, the engine may be unable to rapidly transition from a high to a low compression ratio. Since the rate at which the engine can switch compression ratios during transient conditions depends on the speed at which the VCR control shaft can be moved by the VCR actuator, the brake function may negatively affect the transient acceleration potential of the engine. Slow transitions may result in slow accelerations which are objectionable to the driver.

In one example, the issues described above may be addressed by a method for an engine comprising: maintaining a position of a control shaft for varying a compression ratio of an engine via braking force from a brake; and adjusting the braking force prior to and during actuation of the control shaft based on operating conditions. In this way, a VCR engine may be held at a fixed CR setting with reduced power consumption, while being able to rapidly switch between CR settings during torque transients.

As one example, a VCR mechanism may include an eccentric for varying a piston position of a cylinder in accordance with a commanded compression ratio. An engine controller may change the piston position by sending a control signal to a VCR actuator coupled to a control shaft (CRCS) of the VCR mechanism to vary the piston position. The VCR mechanism may include a braking device, such as a band brake, for applying a braking force on the control shaft. The band brake may be opened or closed (thereby unlocking or locking it, respectively) via a spring loaded solenoid valve that is hydraulically or electrically actuated. The spring loaded valve may be biased in a direction that closes/locks the band brake, when in a default position. When the band brake is locked, it applies a braking force on the control shaft, reducing shaft motion, and locking the CR setting of the engine. By adjusting a pressure applied on the spring in a direction opposite to its biasing, the band brake may be loosened, which reduces the brake torque applied on the control shaft. The brake torque applied may be varied based on engine operating conditions, such as engine speed, load, and torque demand, as well as based on scheduled CR transitions and transmission gearshifts. For example, the brake torque applied via the band brake on the control shaft may be reduced prior to and during a CR transition, and coordinated with the torque applied on the shaft by the VCR actuator, so as to enable the CR transition to be completed at a desired velocity. A higher brake torque may be coordinated with disabling power to the VCR actuator during engine speed-load conditions where the engine needs to be held in a high CR setting (e.g., higher than an upper threshold), or a low CR setting (e.g., smaller than a lower threshold) where a sudden large change in speed-load or demanded CR is not expected. However, during conditions where the engine needs to be held in an intermediate CR setting (e.g., lower than the upper threshold and higher than the lower threshold), such as during gear shifts, even while the engine speed-load is not changing, a lower brake torque may be applied to keep the control shaft loose enough since a sudden transition is expected. In addition, during torque transients, such as when engine speed-load is changing, a lower brake torque may be applied to improve transient response.

Further, during CR transitions, the brake torque may be adjusted based on a desired rate of CR transition relative to an actual rate of CR transition. For example, during a transition from a higher CR setting to a lower CR setting, engine torque may be used to enable at least a portion of the transition. Then, if additional torque is required to complete the transition or to expedite the transition, the brake torque applied on the control shaft via the brake mechanism may be reduced. Alternatively, if additional brake torque is required to slow down the transition, the brake torque applied on the control shaft via the brake mechanism may be increased.

In this way, a brake torque applied on a control shaft of a VCR engine via a braking mechanism can be used to maintain a fixed CR setting of the VCR engine with reduced power consumption, improving the fuel economy of the engine. The technical effect of varying the braking pressure (or brake torque) applied on the VCR control shaft (via the braking mechanism) as a function of operating conditions is that transient response time can be improved. In addition, a position signal received via a VCR actuator can be used to calculate the velocity of the control shaft, allowing for finer control of CR transition rates. The technical effect of adjusting the brake torque applied on the shaft as a function of shaft velocity and CR setting is that CR transitions can be enabled at a desired transition rate. Brake torque from the braking mechanism can be coordinated with motor torque applied on the shaft via the VCR actuator to enable smoother and faster CR transitions. Further, mechanical hard stops of the control shaft can be reduced. By improving CR transitions while reducing power consumption, performance and fuel efficiency of a VCR engine can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 9 shows a table of example settings of a CRCS, VCR actuator, and a brake band at different engine operating conditions.

DETAILED DESCRIPTION

Figure 10:
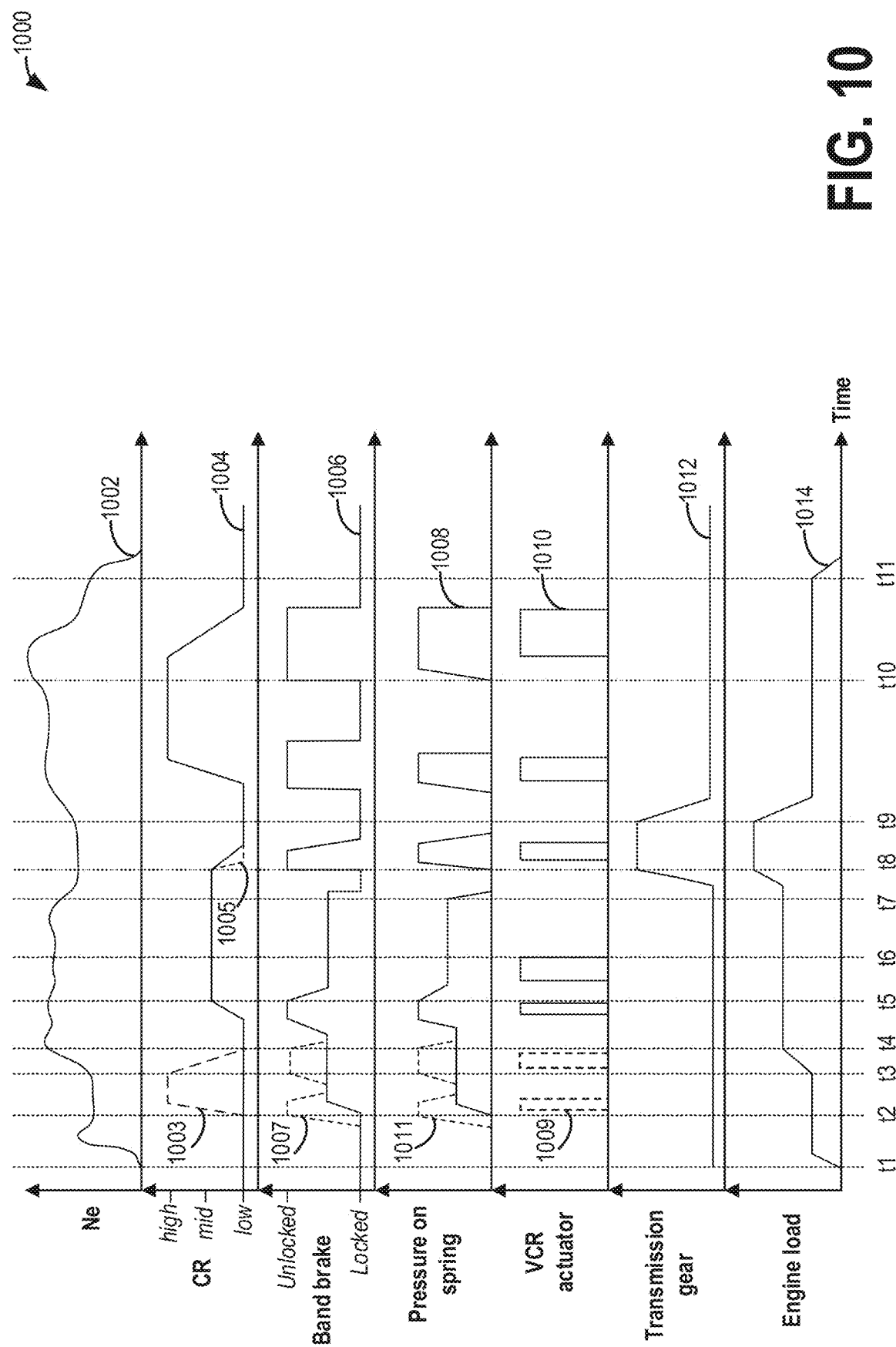
FIG. 10 shows a prophetic example of varying brake pressure from a braking mechanism on the CRCS with change in engine operating conditions.

The following description relates to systems and methods for an engine system configured with a variable compression ratio (VCR) mechanism, as described with reference to the engine system of FIGS. 1-2. A controller may be configured to perform a control routine, such as the example routine of FIGS. 3-4, to lock a band brake coupled to a VCR control shaft to maintain a fixed CR setting, and vary a brake pressure applied by the band brake to improve CR transitions. As elaborated at FIG. 5, the brake pressure may be modulated as a function of the engine torque applied on the control shaft during a CR transition, the engine torque learned as a function of engine speed-load (FIG. 8). Brake pressure applied via the bank brake may be adjusted via a hydraulic or an electric actuator, as elaborated at FIGS. 6A-6B. The controller may lock the band brake when the engine's CR setting is in a high or a low region, while unlocking the band brake and modulating the brake pressure when the CR setting is in an intermediate region, such as with reference to the CR map of FIG. 7. Example settings for the band brake are tabulated at FIG. 9. An example VCR operation with locking and unlocking of the braking mechanism and modulation of a brake pressure applied on the VCR control shaft is shown at FIG. 10. In this way, the performance and fuel economy of a VCR engine can be improved.

Figure 1:
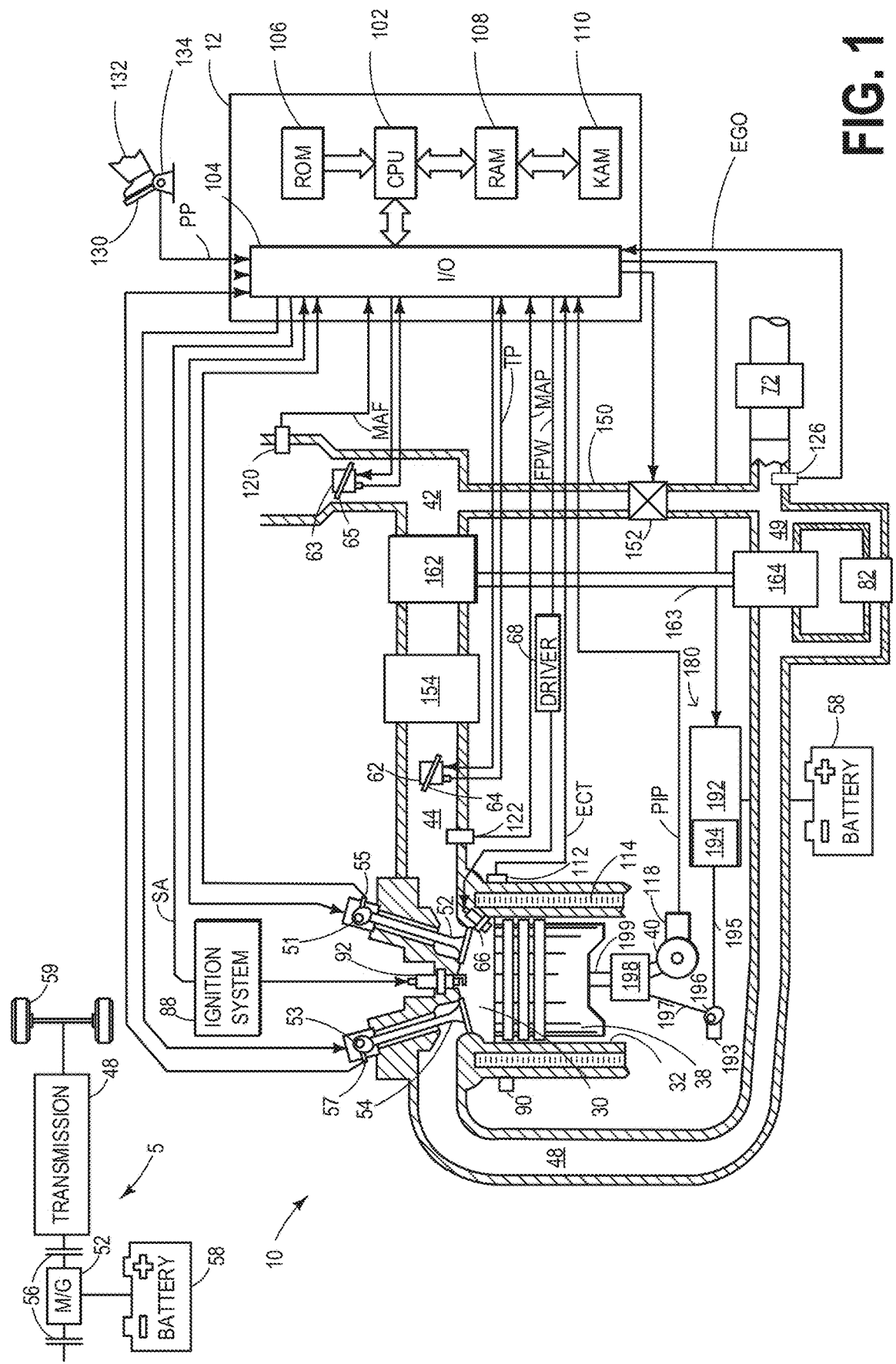
FIG. 1 shows an example engine system wherein the compression ratio is variable.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 32 with piston 38 positioned therein. Piston 38 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Engine 10 may be configured as a variable compression ratio (VCR) engine wherein the compression ratio (CR) of each cylinder (that is, the ratio of the cylinder volume when the piston is at bottom-dead-center (BDC) to the cylinder volume when the piston is at top-dead-center (TDC)) can be mechanically altered. The CR of the engine may be varied via a VCR actuator 192 actuating a VCR mechanism 180. In some example embodiments, the CR may be varied between a first, lower CR (wherein the ratio of cylinder volume when the piston is at BDC to the cylinder volume when the piston is at TDC is smaller) and a second, higher CR (wherein the ratio is higher). In still other example embodiments, there may be a predefined number of stepped compression ratios. Further still, the CR may be continuously variable between the first, lower CR and the second, higher CR (to any CR in between).

VCR mechanism 180 includes a VCR actuator 192 including a speed reduction mechanism 194, a VCR actuator linkage 195, a control shaft 196, a position sensor 193, a control link 197, a lower link 198, and an upper link 199. In some examples, the VCR actuator may additionally have one or more mid-links intermediate the upper link and the lower link. The VCR actuator 192 is coupled to the control shaft 196 via the actuator linkage 195. The position sensor 193 may be coupled to the control shaft 196 and may be configured to provide feedback to controller 12 regarding the position of the control shaft 196. In one example, position sensor 193 indicates a degree of rotation of the control shaft 196. The control shaft 196 is coupled to the lower link 198 via the control link 197. The lower link 198 is coupled to a crankshaft 40, further coupled to a piston 38 via upper link 199. A braking mechanism, herein also referred to a band brake 191, may be couplable to control shaft 196 for locking motion of the control shaft. By locking the control shaft, a fixed compression ratio may be maintained. A detailed embodiment of the VCR actuation mechanism and the braking mechanism is discussed with reference to FIG. 2.

Figure 2:
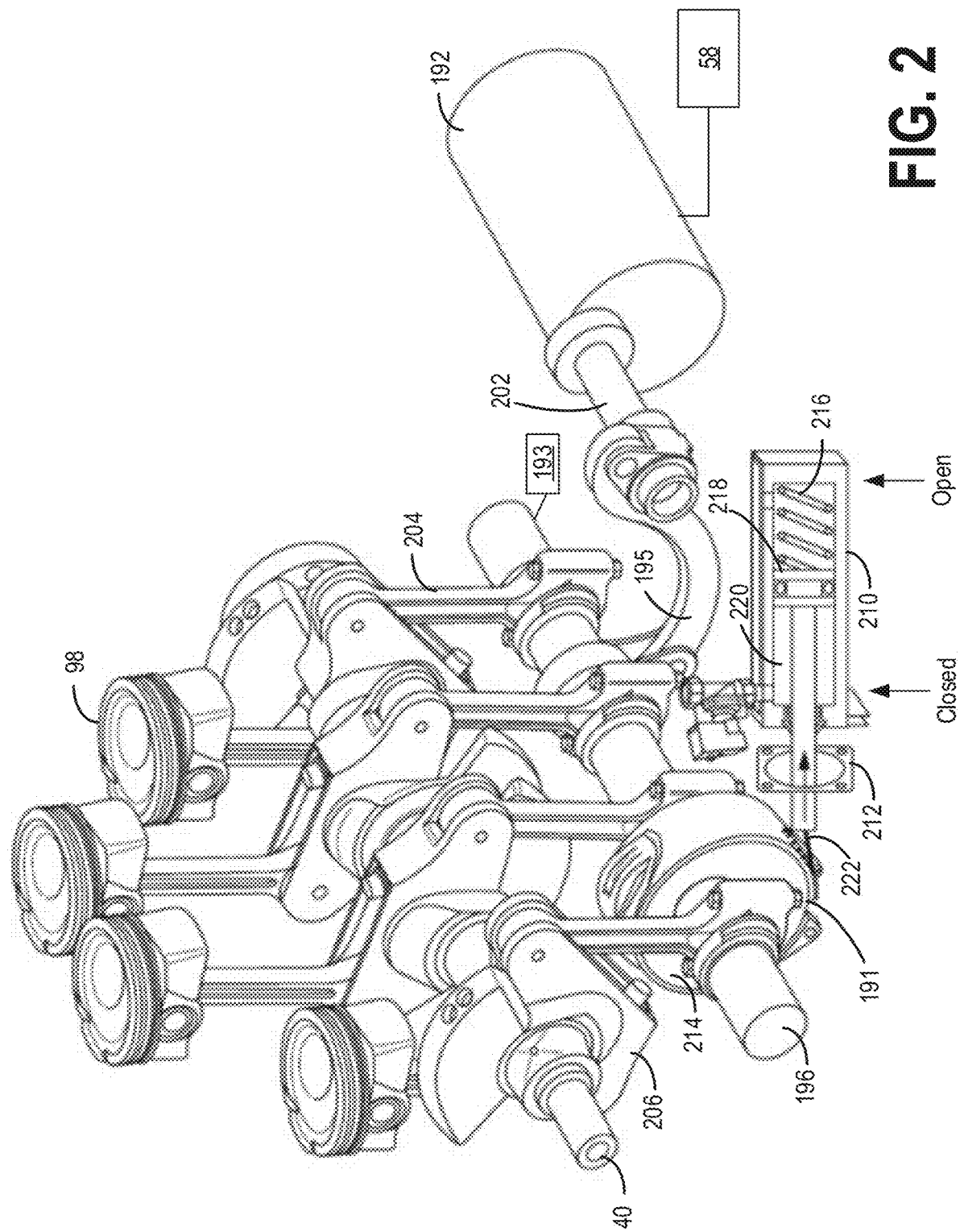
FIG. 2 shows an example embodiment of a variable compression ratio (VCR) engine system including a VCR actuator and a control shaft braking mechanism.

In the example depicted in FIGS. 1-2, the VCR actuator 192 is an electric motor, and is supplied with power via a battery 58 to produce motor torque. In other examples, the VCR actuator 192 may be hydraulically or pneumatically driven. In one example, the speed reduction mechanism 194 may be a harmonic drive, and the VCR actuator an electric motor, such that the harmonic drive in conjunction with the actuator linkage 195 may convert a given amount of electric motor rotation into a lesser amount of control shaft 196 rotation but high enough torque to withstand the combustion loading. The speed reduction mechanism 194 may alternatively include a cycloidal reduction gear. In the depicted example, the position sensor 193 is a rotary-type potentiometer for sensing the rotation angle of control shaft 196. In the example depicted in FIG. 1, the actuator linkage 195 is an S linkage and the control shaft 196 is rotatably supported on the engine body and possesses an eccentric region. The control link 197 may be attached to the eccentric region of the control shaft 196 such that, as the control shaft 196 changes angular position, the eccentric region also changes angular position, causing the control link 197 to either move up (towards piston 38) or down (away from piston 38), depending on the initial and final position of the control shaft 196. In one example, the lower link may be attached to the crankshaft 40 at a central or middle region (of the lower link 198), with the control link 197 and upper link 199 attached at opposing sides of this central region, such that movement of the control link upwards (towards piston 38) causes the upper link to move downwards (away from the piston 38), or vice versa, as the lower link 198 pivots about its crankshaft 40 attachment point. As the upper link 199 moves up or down, a piston stroke characteristic including piston TDC position relative to piston BDC position will change, thereby changing cylinder CR.

The control system 12 may measure the position of control shaft 196 via position sensor 193. The current supplied by the battery 58 to the VCR actuator 192 may be controlled by controller 12 based on a desired position of the VCR actuator that provides a target CR setting. Once a CR setting is commanded, the controller may further control the VCR actuator position via position feedback control based on input from a position sensor, such as position sensor 193. Therein, the control shaft 196 position corresponding to the commanded CR setting is maintained based on a measured position of the control shaft 196 as determined by position sensor 193. As the control shaft is subject to forces arising from combustion within the engine cylinder 30, the controller 12 may apply a current to VCR actuator 192 from battery 58, proportional to the control shaft torque and in a direction, to maintain control shaft position (and therefore CR) at a commanded set point. This current is also referred to herein as the holding current, that is, the current required to be applied to hold the VCR actuator in a given position (corresponding to a commanded CR).

The VCR 180 mechanism may be coupled to a conventional cranktrain or an unconventional cranktrain. Non-limiting examples of an unconventional cranktrain to which the VCR mechanism 180 may be coupled include variable distance head crankshafts and variable kinematic length crankshafts. In one example, crankshaft 40 may be configured as an eccentric shaft. In another example, an eccentric may be coupled to, or in the area of a piston pin, the eccentric changing the position of the piston within the combustion chamber. Movement of the eccentric may be controlled by oil passages in the piston rod.

It will be appreciated that still other VCR mechanisms that mechanically alter the compression ratio may be used. For example, the CR of the engine may be varied via a VCR mechanism that changes a cylinder head volume (that is, the clearance volume in the cylinder head). In still another example, the VCR mechanism may include a hydraulic pressure, air pressure, or mechanical spring reactive piston. Further still, the VCR mechanism may include a multi-link mechanism or a bent rod mechanism. Still other VCR mechanizations may be possible. It will be appreciated that as used herein, the VCR engine may be configured to adjust the CR of the engine via mechanical adjustments that vary a piston position or a cylinder head position or a cylinder head volume. As such, VCR mechanisms do not include effective CR adjustments achieved via adjustments to a valve timing or cam timing.

By adjusting the position of the piston within the cylinder, an actual (static) compression ratio of the engine (that is a difference between cylinder volumes at TDC relative to BDC) can be varied. In one example, reducing the compression ratio includes reducing a displacement of the piston within the combustion chamber by increasing a distance between a top of the piston from a cylinder head. For example, the engine may be operated at a first, lower compression ratio by the controller sending a signal to the VCR actuator 192 to actuate the VCR mechanism 180 to a first position where the piston has a smaller effective displacement within the combustion chamber. As one example, the controller 12 may select a lower CR setting during an engine start and in a high engine speed-load region. The controller 12 may command a corresponding current to the VCR actuator 192, where the VCR actuator may be a harmonic drive motor. This causes the harmonic drive motor to undergo a designated amount of rotation, which is transduced to the control shaft 196 via the S linkage. The eccentric region of control shaft 196 then undergoes an angular displacement causing the control link 197 to move up, towards piston 38. Through the pivoting action of the lower link 198, the upper link 199 and piston 38 are moved lower in cylinder 30 at TDC, thus decreasing the cylinder CR. As another example, the engine may be operated at a second, higher compression ratio responsive to a drop in engine speed or load. The controller may send a signal to the VCR actuator 192 to actuate the VCR mechanism 180 to a second position where the piston has a larger effective displacement within the combustion chamber. As one example, the controller 12 may select a higher CR setting, and command a corresponding current to the harmonic drive motor. This causes the harmonic drive motor to undergo a designated amount of rotation, which is transduced to the control shaft 196 via the S linkage. The eccentric region of control shaft 196 then undergoes an angular displacement causing the control link 197 to move down, away from piston 38. Through the pivoting action of the lower link 198, the upper link 199 and piston 38 are moved higher in cylinder 30 at TDC, thus increasing the cylinder CR.

Changes in the engine compression ratio may be advantageously used to improve fuel economy. For example, a higher compression ratio may be used to improve fuel economy at light to moderate engine loads until spark retard from early knock onset erodes the fuel economy benefit. The engine can then be switched to a lower compression ratio, thereby trading off the efficiency benefits of higher compression ratio for the efficiency benefits of optimized combustion phasing. Continuous VCR systems may continuously optimize the trade-offs between combustion phasing and the efficiency benefits of higher compression ratio, to provide the optimal compression ratio between the higher compression ratio and lower compression ratio limits at the given operating conditions. In one example, an engine controller may refer a look-up table to select a compression ratio to apply based on engine speed-load conditions. As elaborated below, the selecting may include selecting a lower compression ratio at higher engine loads, and selecting a higher compression ratio at lower engine loads.

Cylinder 30 can receive intake air via a series of intake air passages 42, and 44. Intake air passage 44 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 162 arranged between intake passages 42 and 44, and an exhaust turbine 164 arranged along exhaust passage 48. Compressor 162 may be at least partially powered by exhaust turbine 164 via a shaft 163 where the boosting device is configured as a turbocharger. However, in other examples, such as where engine 10 is provided with a supercharger, exhaust turbine 164 may be optionally omitted, where compressor 162 may be powered by mechanical input from a motor of the engine. A throttle 62 including a throttle plate 64 may be provided along an intake passage of the engine for varying the flow rate and/or pressure of intake air provided to the engine cylinders. For example, throttle 62 may be disposed downstream of compressor 162 as shown in FIG. 1, or alternatively may be provided upstream of compressor 162. In addition, the engine system may include an air intake system (AIS) throttle 63 and throttle plate 65 located upstream of the compressor in intake passage 42.

Exhaust passage 48 can receive exhaust gases from other cylinders of engine 10 in addition to cylinder 14. Exhaust gas sensor 126 is shown coupled to exhaust passage 48 upstream of emission control device 72. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 72 may be a three way catalyst (TWC), NOx trap, various other emission control devices, or combinations thereof.

Exhaust temperature may be estimated by one or more temperature sensors (not shown) located in exhaust passage 48. Alternatively, exhaust temperature may be inferred based on engine operating conditions such as speed, load, air-fuel ratio (AFR), spark retard, etc. Further, exhaust temperature may be computed by one or more exhaust gas sensors 126. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 52 and at least one exhaust poppet valve 54 located at an upper region of cylinder 30. In some embodiments, each cylinder of engine 10, including cylinder 30, may include at least two intake poppet valves and at least two exhaust poppet valves located at an upper region of the cylinder.

Intake valve 52 may be controlled by controller 12 by cam actuation via cam actuation system 51. Similarly, exhaust valve 54 may be controlled by controller 12 via cam actuation system 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by valve position sensors 55 and 57, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 38 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock through charge cooling. The compression ratio may also be mechanically varied based on driver demand via adjustments made to the VCR mechanism by the VCR actuator 192, varying the effective position of piston 38 within combustion chamber 14.

In some embodiments, each cylinder of engine 10 may include a spark plug 92 for initiating combustion. Ignition system 88 can provide an ignition spark to combustion chamber 30 via spark plug 92 in response to spark advance signal SA from controller 12, under select operating modes. However, in some embodiments, spark plug 92 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 66. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion chamber 30. While FIG. 1 shows injector 66 as a side injector, it may also be located overhead of the piston, such as near the position of spark plug 92. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 66 from a high pressure fuel system including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 66 may be a port injector providing fuel into the intake port upstream of cylinder 30.

It will also be appreciated that while the depicted embodiment illustrates the engine being operated by injecting fuel via a single direct injector; in alternate embodiments, the engine may be operated by using two or more injectors (for example, a direct injector and a port injector per cylinder, or two direct injectors/two port injectors per cylinder, etc.) and varying a relative amount of injection into the cylinder from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 126. By measuring an amount of residual oxygen (for lean mixtures) or unburned hydrocarbons (for rich mixtures) in the exhaust gas, the sensor may determine the AFR. As such, the AFR may be provided as a Lambda (λ) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows one cylinder of a multi-cylinder engine. As such each cylinder may similarly include its own set of intake/exhaust valves, fuel injector(s), spark plug, etc.

Engine 10 may further include a knock sensor 90 coupled to each cylinder 30 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft position sensor such as a Hall Effect sensor to indicate an abnormal combustion event in the cylinder. In one example, based on the output of knock sensor 90 in one or more defined windows (e.g., crank angle timing windows), abnormal combustion due to one or more of knock and pre-ignition may be identified and differentiated. For example, knock may be identified responsive to knock sensor output estimated in a knock window being higher than a knock threshold, while pre-ignition may be identified responsive to knock sensor output estimated in a pre-ignition window being higher than a pre-ignition threshold, the pre-ignition threshold higher than the knock threshold, the pre-ignition window earlier than the knock window. Further, the abnormal combustion may be accordingly addressed. For example, knock may be addressed by reducing the compression ratio and/or retarding spark timing while pre-ignition may be addressed by enriching the engine and/or limiting an engine load. In addition, lowering the compression ratio also reduces the changes of further pre-ignition.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 48 to vehicle wheels 59 when one or more clutches 56 are engaged. In the depicted example, a first clutch 56 is provided between crankshaft 40 and electric machine 52, and a second clutch 56 is provided between electric machine 52 and transmission 48. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 48 and the components connected thereto. Transmission 48 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 59. Electric machine 52 may also be operated as a generator to provide electrical power to charge battery 58, for example during a braking operation.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; absolute manifold pressure signal (MAP) from sensor 122, cylinder AFR from EGO sensor 126, abnormal combustion from knock sensor 90 and a crankshaft acceleration sensor. The VCR mechanism position may be obtained from sensor 193, which may be a rotary-type potentiometer or rotary encoder for sensing the rotation of the control shaft 196 or actuator linkage 195. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller. Example actuators include throttle 62, fuel injector 66, VCR actuator 192, EGR valve 152 (which controls flow through EGR conduit 150), and waste-gate 82. As one example, based on the engine speed and load, the controller may adjust the compression ratio of the engine by sending a signal to the VCR actuator 192 which actuates the control shaft 196 which in turn adjusts the poster of lower link 198 to mechanically move the piston closer to or further from the cylinder head, to thereby change a volume of the combustion chamber.

Non-transitory storage medium read-only memory 106 can be programmed with computer readable data representing instructions executable by processor 102 for performing the methods described below as well as other variants that are anticipated but not specifically listed.

Turning now to FIG. 2, an example embodiment 200 of a VCR mechanism and its associated braking mechanism is shown. In one example, the VCR mechanism of embodiment 200 includes VCR mechanism 180 of FIG. 1. Components previously introduced are numbered similarly and not re-introduced.

Engine 10 is depicted herein as a 4-cylinder in-line engine with piston 98 of each cylinder coupled to crankshaft 40. The compression ratio (CR) of each cylinder (that is, the ratio of the cylinder volume when piston 98 is at bottom-dead-center (BDC) to the cylinder volume when the piston is at top-dead-center (TDC)) can be mechanically altered. The CR of the engine may be varied via VCR actuator 192. In the depicted example, VCR actuator 192 is electrically actuated upon drawing electrical power from battery 58. Specifically, VCR actuator 192 is an electric motor that produces motor torque using electrical power from battery 58 to adjust a position of the piston 98.

VCR actuator 192 is coupled via an output shaft 202 to an actuator linkage 195. In the depicted example, actuator linkage 195 is an S-link rod. Actuator linkage 195 couples the VCR actuator to a compression ratio control shaft (CRCS) 196. CRCS 196 is coupled to midlink 206 via a control connection rod 204, the midlink 206 in turn connected to crankshaft 40. CRCS 196 is rotatably supported on a body of engine 10, specifically to crankshaft 40 via midlink 206 which rotates with the crankshaft. As a result, connection rod 204 moves side to side. Control connection rod 204 may be attached to the eccentric region of CRCS 196 such that, as the control shaft 196 changes angular position, the eccentric region also changes angular position. For example, responsive to a change in engine operating conditions that require a corresponding change in CR, a duty cycle is commanded to the VCR actuator which moves the actuator linkage 195. This in turn moves CRCS 196 which contains the eccentric. This in turn moves connection rod 204 up and down, and then on the other side of midlink 206 (acting like a teeter totter) moves the connection rod and piston up and down in the bore. This changes a piston stroke characteristic including piston TDC position relative to piston BDC position, thereby changing cylinder CR.

Position sensor 193 is coupled to CRCS 196 and is configured to provide feedback to a controller 12 regarding the position of CRCS 196. For example, a degree of rotation, as well as a velocity of rotation of CRCS 196 may be inferred based on the output of the position sensor 193. In addition, during conditions when the CRCS is locked, a CR setting of the engine may be inferred with higher accuracy and reliability. In addition, when the CRCS is locked, a path of piston 98 may be inferred with higher fidelity, which allows for better engine knock control and reduced impact on exhaust emissions and fuel economy.

Electrical power is drawn at VCR actuator 192 to enable a CR transition. However, to reduce power consumption during conditions when a fixed CR setting is desired (such as when the engine is in a high or low CR setting and an engine speed-load point is not expected to vary significantly), the VCR actuator 192 may be disabled (by disabling power to the actuator) and a position of CRCS 196 may be locked via a braking mechanism, herein depicted by band brake 191. The band brake may be a braking disc that is coupled coaxially to CRCS 196. A degree of tightening or locking of the band brake over control shaft 196 may be adjusted via a spring-loaded solenoid valve 210 having a spring 216 that is biased in a direction that holds valve 410 closed. The band brake 191 is coupled to valve 210 via connector 222. Specifically, a position of stem 218 is adjustable along a length L2 of the valve 210, between a first fully closed position and a second fully open position. The first fully closed position is the default position due to the biasing of spring 216. A position of stem 218 may be varied by adjusting a hydraulic pressure (e.g., oil pressure) applied within chamber 220. As the hydraulic pressure in chamber 220 increases, the pressure is able to overcome the spring pressure, moving the valve further from the first fully closed position towards the second fully open position. The change in pressure at chamber 220 may be achieved via hydraulic or electric actuation.

When valve 210 is fully closed, the band of band brake 191 is held tightly over the control shaft. As a result, the brake pressure applied by the band brake 191 on the CRCS 196 is increased, and the CRCS 196 is held locked. When valve 210 is fully open, the band of band brake 191 is held loosely over the control shaft. As a result, the brake pressure applied by the band brake 191 on the CRCS 196 is decreased, and the CRCS 196 is held unlocked. In this position, the CRCS is able to freely move. Consequently when a motor torque is applied on the CRCS 196 via the VCR actuator 192, the CRCS is able to rapidly transition to the desired setting. When valve 210 is partially open, such as when the position of the stem 218 is in-between the fully open and fully closed positions, a degree of tightness of the band of band brake 191 is variable. As a result, the brake pressure applied by the band brake 191 on the CRCS 196 is varied, which affects the degree of motion of the CRCS 196. In one example, the brake pressure may be varied based on engine operating conditions to hold the CRCS in place without aid from VCR actuator 196 while still maintaining the CRCS loose enough to allow the VCR actuator to move the CRCS in the event the desired compression ratio changes.

The band brake 191 may be hydraulically or electrically actuated. In the depicted example, the band brake 191 is hydraulically actuated by varying the hydraulic pressure in chamber 420. Hydraulic actuator 210 of the band brake 191 may be bolted to the side of the engine 10 or an oil pan, with the oil seal kept intact with a gasket 212. A cylindrical feature 214 may be cast into CRCS 196 that band brake 191 interfaces with. The cylinderical feature is co-axial with CRCS 196 and is configured to have a diameter of D1 and a length L1. A location of placement of cylindrical feature 214 along CRCS 196 is selected to increase the diameter of a brake disk of the brake band before incurring interference with crank lobes 216.

In an alternate example, the band brake 191 is electrically actuated. Therein a pulse-width of a duty cycle applied to valve 210 varies a position of the stem 218 between the fully open and fully closed positions. As with the hydraulic actuation, when no power is provided, the valve defaults to a closed position where the band brake locks the CRCS.

In this way, the components of FIGS. 1-2 enable an engine system comprising: an engine; a control shaft for varying a compression ratio of the engine; a brake for applying a brake torque on the control shaft, the brake actuated via a spring-loaded solenoid valve; an electrical actuator for applying a motor torque on the control shaft; a transmission including a plurality of gears; and a controller storing executable instructions in non-transitory memory that, when executed, cause the controller to: maintain the control shaft in a fixed position via the brake to maintain a first compression ratio setting of the engine; and responsive to a request to transition the engine to a second compression ratio setting, lower than the first setting, adjust a ratio of the brake torque from the brake and the motor torque from the electrical actuator on the control shaft as a function of engine torque applied on the control shaft due to cylinder combustion. The controller may include further instructions that cause the controller to:

after transitioning to the second compression ratio setting, increase the brake torque while reducing the motor torque to maintain a position of the control shaft; and then initiate a transmission gearshift. Herein, when the second compression ratio setting is within a threshold compression ratio range corresponding to a higher rate of change of engine speed or load, increasing the brake torque may include increasing the brake torque to enable a first degree of control shaft motion, and when the second compression ratio setting is outside the threshold compression ratio range, increasing the brake torque may include increasing the brake torque to enable a second degree of control shaft motion, smaller than the first degree. The controller may enable the first degree of control shaft motion by increasing the brake torque until a position of the control shaft is outside an upper end of a position range corresponding to the threshold range, and then decreasing the brake torque until the position of the control shaft is outside a lower end of the position range.

Figure 3:
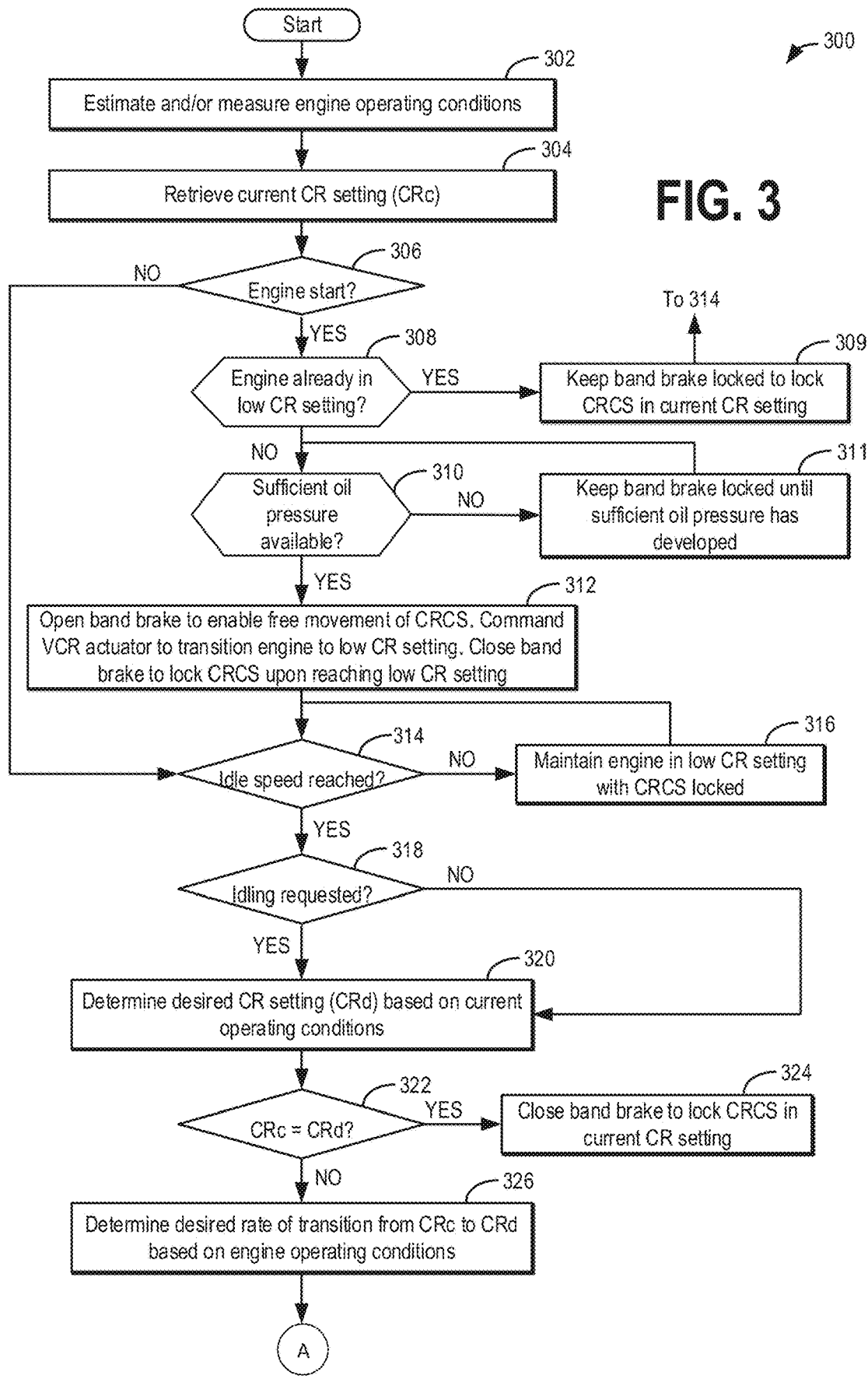
FIGS. 3-4 show a high level flow chart of a method for operating the VCR actuator and braking mechanism of the VCR engine based on engine operating conditions.
Figure 4:
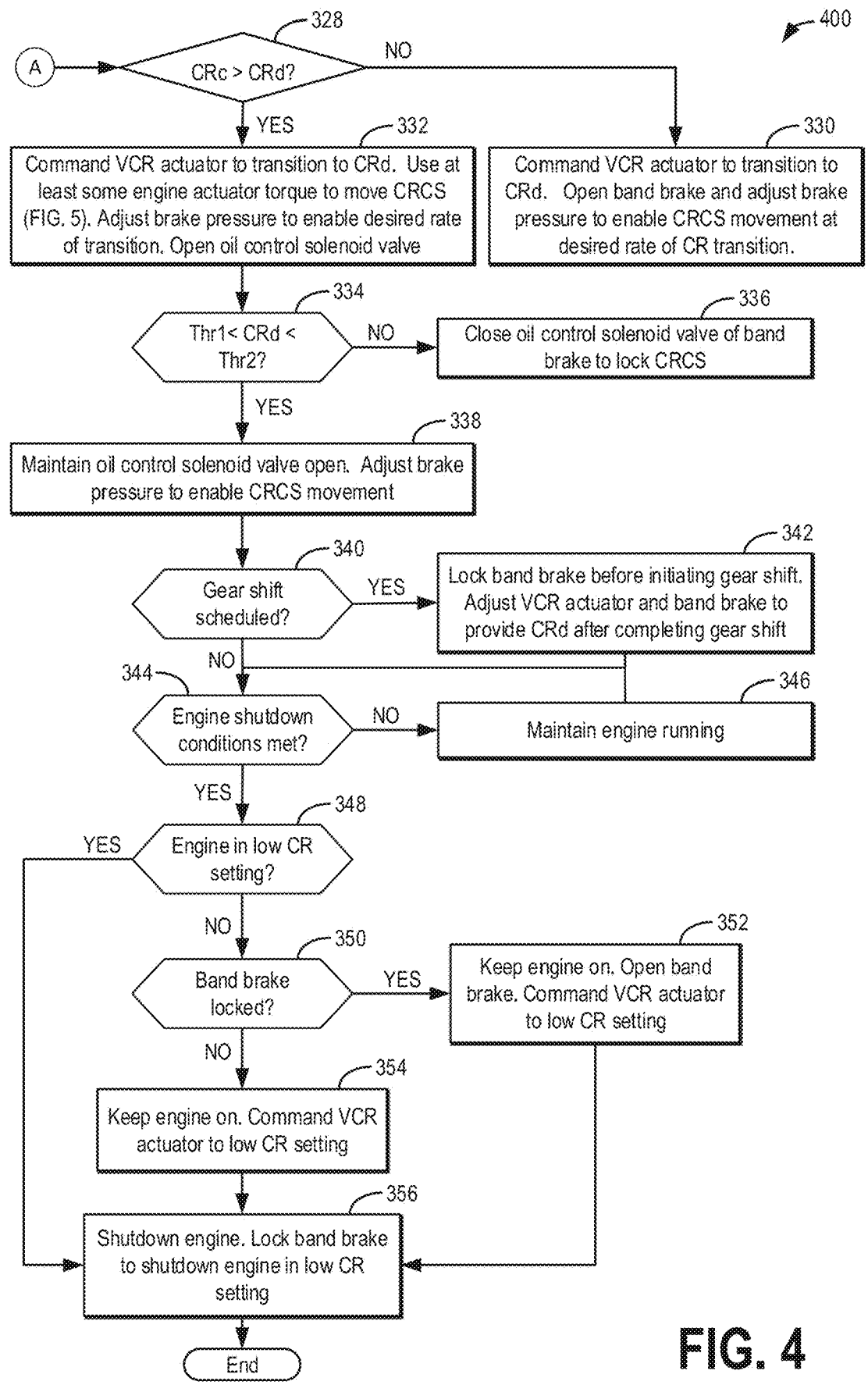

Turning now to FIGS. 3-4, an example routine 300 is described for selecting and commanding a CR setting for a VCR engine based on engine operating conditions, and coordinating VCR actuator operation with control shaft braking operations. It will be appreciated that the method of FIG. 4 is a part of the method of FIG. 3. Instructions for carrying out method 300 as well the other methods included herein may be executed by a controller based on instructions stored in a memory of the controller and in conjunction with signals received from sensors of the engine system, such as the sensors described above with reference to FIG. 1. The controller may employ engine actuators of the engine system to adjust engine operation, according to the methods described below.

At 302, method 300 includes estimating and/or measuring engine operating conditions. Engine operating conditions may include, for example, driver power demand (for example, as based on an output of a pedal position sensor coupled to an accelerator pedal); ambient temperature, pressure, and humidity; engine speed, engine temperature; manifold pressure (MAP); manifold air flow (MAF); catalyst temperature; intake temperature; boost level; fuel octane of fuel available in a fuel tank; etc.

At 304, the method includes retrieving a current compression ratio (CR) setting of the engine, herein indicated as CRc. For example, the compression ratio setting may be retrieved based on input from a position sensor coupled to a control shaft of the VCR mechanism. As another example, the compression ratio setting may be retrieved from the controller's memory based on a last commanded CR setting.

The VCR mechanism (e.g., VCR mechanism 180 of FIG. 1) is configured to mechanically alter the engine's compression ratio (CR) setting. For example, the CR setting may be altered between a first, lower and a second, higher compression ratio setting, or to one or multiple discrete settings in between the lower and the higher CR setting. For example, the VCR mechanism of each cylinder may be actuated in tandem move the engine between a low CR of 8.0, a high CR of 14.0, and an intermediate CR of 11.0. Still other settings may be possible. As discussed with reference to FIGS. 1-2, the VCR mechanism may adjust the engine's CR setting by mechanically altering a piston position within each cylinder via a duty cycle commanded to a VCR actuator that moves a compression ratio control shaft (CRCS). In one example, a VCR mechanism such as that described in FIG. 1 may achieve the different CR settings by employing the VCR actuator 192 to change the position (angle) of CRCS 196 through the actuator linkage 195. As one example, the VCR actuator is a harmonic drive motor, the control shaft is a shaft containing an eccentric region (e.g., an ellipse), and the actuator linkage is an S linkage. As the control shaft position (angle) is changed by action of the VCR actuator and actuator linkage, the control link, such as control link 197, changes position. As the eccentric region of the control shaft rotates, the control link attached thereto will move either up (towards the piston head) or down (away from the piston head), depending on the angular orientation of the eccentric region. In one example, the CR of a cylinder may be decreased by changing the angular position of the control shaft such that the control link moves up, causing the lower link to pivot, causing the upper link and the piston head to move down. This results in a larger combustion chamber volume when the piston head is at TDC, and thus a smaller CR. Alternatively, the CR of a cylinder may be increased by changing the angular position of the control shaft such that the control link moves down, causing the lower link to pivot, causing the upper link and piston head to rise higher in the combustion. This results in a smaller combustion chamber volume when the piston is at TDC, and thus a larger CR. In this way, the VCR mechanism may continously control the engine CR between a maximum and minium CR as determined by the shape and size of the eccentric of the control shaft. As detailed below, when the CR setting is to be maintained at a fixed setting, movement of the CRCS may be disabled by locking the CRCS via a braking mechanism, herein a band brake.

At 306, based on engine operating conditions, it is determined if an engine start is confirmed. An engine start may be requested after a period of engine shutdown, such as due to an operator requesting torque to propel a vehicle or to operate a compressor responsive to a request for cabin air conditioning. Alternatively, where the engine is configured with idle start/stop capabilities, the engine may be restarted automatically, without operator input, due to a drop in battery state of charge.

Upon confirming an engine start, it may be determined at 308 if the engine is already in a low CR setting. It may be desirable to start the engine while in a low CR setting to improve startability. For example, the engine may have been shut down with the engine in the lowest possible CR setting for the given VCR configuration. In one example, where the lowest compression ratio setting possible is 8.0, it may be confirmed that the engine is already at CR 8.0. If the engine is already at the lowest CR setting, then at 309, the method includes closing a valve coupled to the brake band to lock the CRCS in place, which holds the engine fixed in the current CR setting. When the brake band valve is closed, the brake band is able to limit motion of the control shaft. Consequently, a CR setting of the engine is fixed. Locking the brake band includes disabling power to a brake band actuator (or maintaining power disabled). As discussed with reference to FIG. 2, the brake band state is changed by hydraulically or electrically actuating a spring loaded valve. When power is disabled, the spring loading biases the valve, and thereby the brake band, to a default closed position. Once the brake band is locked, the control shaft is held in the fixed position, allowing the controller to maintain power to the VCR actuator disabled. In this way, the CRCS can be held in a fixed position without consuming power, improving fuel economy and engine startability. In addition, the VCR actuator is not challenged by the higher than normal net variation in torque due to the inherently higher than normal start and idle combustion variability.

If the engine is not already in the low CR setting, then at 310, the method includes confirming that there is sufficient oil pressure available to open the band brake and change the CR setting. Without oil pressure from the engine running, it may not be possible to disable the band brake until sufficient oil pressure builds. Therefore, if there is insufficient oil pressure, then at 311, the method includes maintaining the band brake locked until sufficient oil pressure has been generated via engine running. If sufficient oil pressure is confirmed, then method moves to 312. It will be appreciated that in embodiments where the band brake is actuated via an electronic solenoid instead of a hydraulic (oil-pressure actuated) solenoid, the method may move directly from 310 to 312 without confirming oil pressure. At 312, the method includes commanding the band brake open so as to enable free movement of the CRCS. In addition, the VCR actuator may be commanded to transition the engine to the low CR setting. Commanding the band brake open includes actuating the hydraulic or electric actuator coupled to the band brake valve to provide a single "pull action" that moves the spring in the opposite direction of its biasing. By opening the valve and loosening the band brake, the control shaft is unlocked and a change in position of the control shaft can then be effected by a torque applied on the shaft via the VCR actuator. This allows the engine to be rapidly transitioned to the low CR setting required to enable a smooth engine start. Once the engine has reached the low CR setting, the band brake may be closed to lock the CRCS and hold the engine in the low CR setting. Commanding the band brake closed includes disabling the hydraulic or electric actuator coupled to the band brake to allow the spring to return to the default locked position based on its biasing.

At 314, it may be determined if the engine has reached an idling speed after the engine start. For example, it may be determined if the engine speed is at or above 400 rpm. If not, then at 316, the engine may be maintained in the low CR setting with the CRCS locked. Else, if engine speed has been reached, then at 318, it may be determined if idling has been requested. Idling at a higher CR setting is more efficient than at the lower CR setting, unless accessory loading from AC compressor and the like cause the engine load to be high enough that knock or spark retard to reduce efficiency. At that point unlocking the CRCS and moving to a slightly lower CR and relocking would be advantageous. Thus, from 318, the method moves to 320 to determine the CR setting required. This includes the CR setting desired to idle the engine in if engine idling was requested at 318, or the CR setting desired to transition the engine to if engine idling was not requested. The controller may then position the engine in accordance.

In particular, at 320, the method includes determining a desired CR setting (CRd) based on current engine operating conditions. In one example, the desired CR setting may be a higher CR setting when engine idling was requested. In another example, CRd is determined based on engine speed-load and torque demand. For example, the controller may calculate the fuel efficiency at each possible compression ratio setting of the engine at the given driver power demand and select the compression ratio that provides the highest fuel efficiency. The controller may compare the fuel efficiency at each compression ratio by comparing the brake specific fuel consumption (BSFC) of the engine at each CR setting (e.g., at CR 8.0, 11.0, and 14.0). The fuel efficiency of the engine at each compression ratio may be determined via a look-up table, a map, an algorithm, and/or an equation, each stored as a function of operating conditions (e.g., engine speed, torque, temperature, humidity, inferred fuel octane, etc.), the settings populated during an initial engine calibration based on a prototype engine. In general, as engine load or BMEP increases, the compression ratio selected may be decreased due to trade-offs between the efficiency benefits of higher CR (which dominate at lower loads) versus the efficiency penalties of knock-limited combustion phasing (which dominate at higher loads). Thus, a lower compression ratio is selected at higher engine loads and a higher compression ratio is selected at lower engine loads.

At 322, it is determined if the current CR setting matches the desired CR setting. For example, if the engine is already in the low CR setting during the engine start and run-up to idle, it may be determined if the operating conditions require the engine to continue to be in the low CR setting. If the desired CR setting matches the current CR setting, then at 324, the method includes closing the band brake to lock the CRCS and disable further movement.

If the current CR setting does not match the desired CR setting, then at 326, the method includes determining a desired rate of transition from the current CR setting to the desired CR setting. For example, it may be determined if the engine is to be transitioned as rapidly as possible, or if the engine is to be transitioned gradually. The method then moves to step 328 of FIG. 4.

Next, at 328, it may be determined if the desired CR setting (CRd) is lower than the current CR setting (CRc). If not, that is when CRd is higher than CRc, at 330, the method includes commanding the VCR actuator to transition the engine to CRd. The controller may send a signal to the VCR actuator to move the CRCS to a position where the engine pistons reach the desired CR. In addition, the method includes opening the band brake and adjusting (e.g., reducing) the brake pressure applied via the band brake on the CRCS to enable CRCS movement at the desired rate of CR transition. In this way, by reducing the brake pressure applied via the braking mechanism, the CRCS can be transitioned, at the desired rate, to a position corresponding to the desired CR setting.

If the desired CR setting (CRd) is lower than the current CR setting (CRc), then at 332, the method includes commanding the VCR actuator to transition the engine to CRd while using at least some engine actuator torque to move the CRCS. As elaborated at FIG. 5, by using at least some engine torque to actuate the transition to a lower CR setting, the power consumed by the VCR actuator is reduced, improving fuel economy. Herein, the engine torque is a torque applied via the engine pistons on the control shaft due to cylinder combustion. Typically they tend to move the control shaft in a direction towards a lower compression ratio setting. Therefore the engine torque can be leverage to reduce the motor torque required by the VCR actuator to enable a CR transition.

The controller may also adjust the brake pressure applied via the band brake on the CRCS to enable the CRCS to be moved to the desired CR setting at the desired rate of transition. The controller may open an oil control solenoid valve to unlock the band brake which unlocks the CRCS. The method then moves to step 334.

As an example, the controller may increasing the braking force applied by the band brake on the CRCS as one or more of an engine torque and a motor torque from the VCR actuator on the control shaft increases, the braking force increased to transition from a first current compression ratio setting to a second, desired compression ratio setting at a target speed of shaft motion, the target speed selected as a function of a hardware limit of the control shaft. The controller may raise the braking force by decreasing a pressure applied on a spring of the spring loaded valve coupled to the band brake, in a direction opposite to a direction of spring biasing.

In another example, the controller may adjust a ratio of the brake torque from the brake and the motor torque from the VCR actuator on the control shaft as a function of engine torque applied on the control shaft due to cylinder combustion. This may include increasing the brake torque and reducing the motor torque to slow down shaft rotation and the CR transition when more (e.g., more than a threshold) engine torque is available to move the shaft. This may also include decreasing the brake torque and increasing the motor torque to speed up shaft rotation and expedite CR transition when less (e.g., less than a threshold) engine torque is available to move the shaft.

At 334, from each of 330 and 332, the method includes determining if the desired CR setting the engine has been transitioned to is in a region δ defined by an upper and a lower threshold. Specifically, it may be determined if the CR setting of the engine following the transitiom is higher than a lower threshold and lower than an upper threshold. The controller may refer to a map, such as example map 700 of FIG. 7, to determine if the engine is in region δ.

Figure 7:
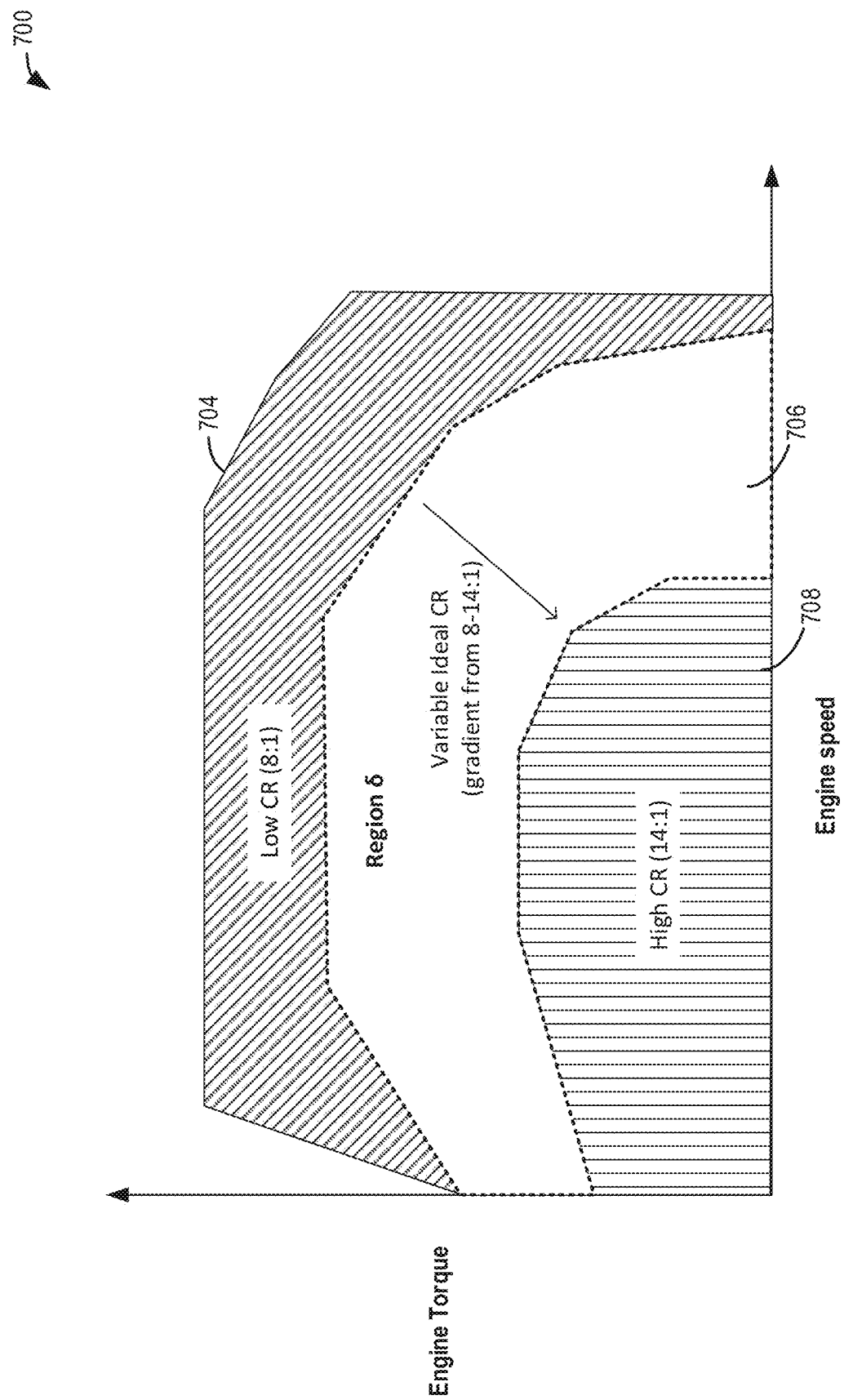
FIG. 7 depicts an example compression ratio map that may be used to adjust a brake pressure applied by the braking mechanism on the CRCS.
Figure 8:
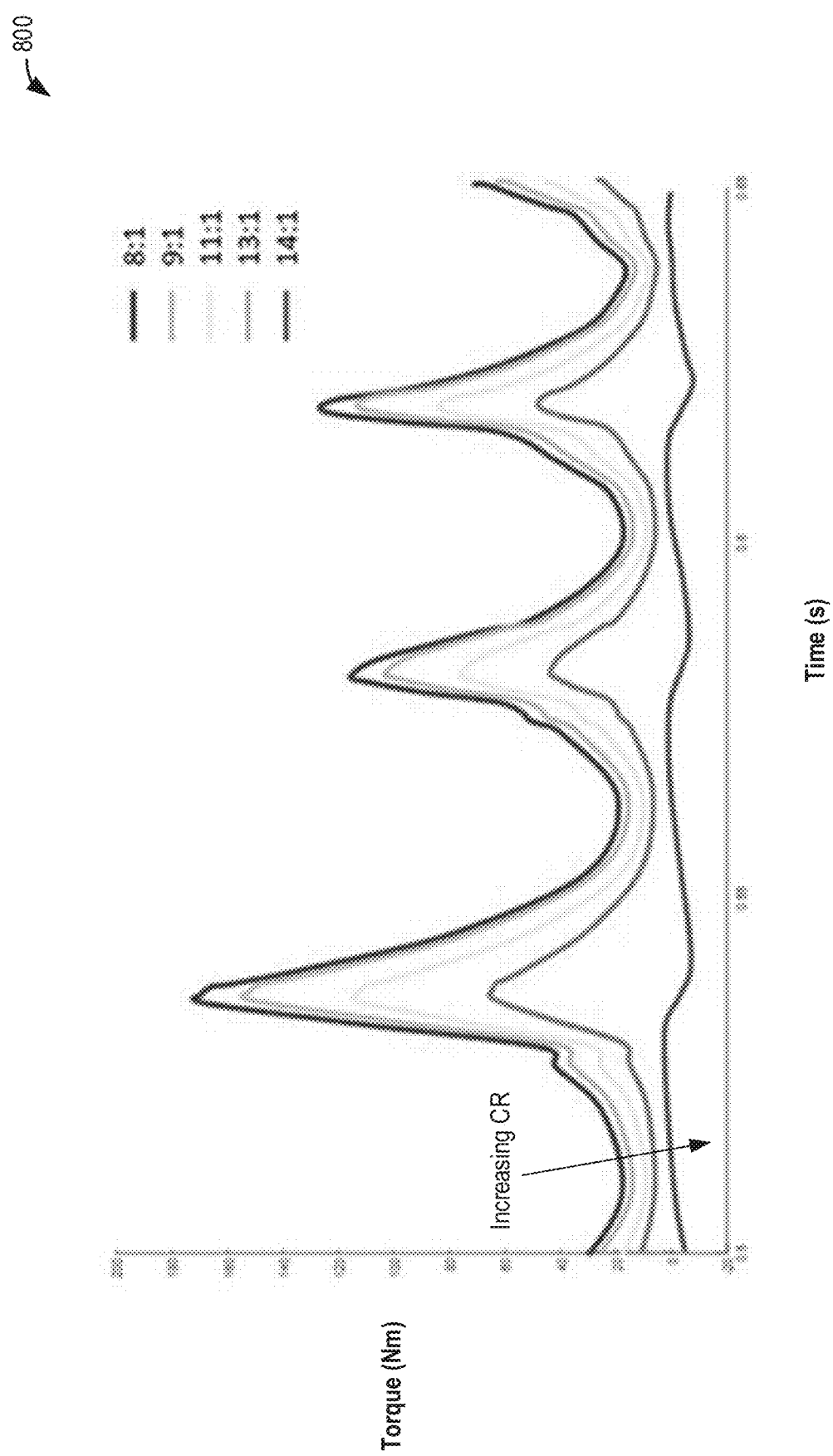
FIG. 8 shows an example map of variation in engine torque applied on the CRCS with compression ratio.

With reference to FIG. 7, the engine CR setting may be continuously variable based on engine speed and load (along the x and y axes) by the VCR actuator between a lowest possible CR setting (shown at region 704, herein CR 8.0) and a highest possible CR setting (shown at region 708, herein CR 14.0). In the intermediate region 706, defined by dashed line 702, the engine may be set to an intermediate or mid-CR setting (herein CR 11.0). When the engine is in either region 704 or region 708, a sudden CR transition is not expected. In these regions, the engine speed-load point changes at a smaller rate (e.g., substantially doesn't change). Therefore when in these regions, the band brake can remain completely locked without affecting fuel economy. For example, the band brake can be locked by reducing the pressure in the hydraulic actuator of the band brake, thereby increasing the brake pressure applied by the band brake on the CRCS. In one example, power to the band brake can be disabled. This increases the fuel economy when operating in these states by not powering the VCR actuator and reducing reliance on its control. However, when the engine is in region 706, a sudden CR transition to either region 704 or region 708 is expected since this is a boundary region. In particular, when in region 706, the engine speed and load may be changing at a faster rate than either region 704 or region 708. Consequently, in this region, the brake pressure applied on the CRCS via the band brake may be modulated to enable the CRCS to move. For example, as the CR moves from either region 704 or region 708 towards region 706, the pressure on the band brake may be reduced (by increasing the pressure on the hydraulic actuator of the band brake). The resulting smaller pressure differential in the hydraulic actuator allows the VCR actuator to move the CRCS in the event that the desired compression ratio changes. At the same time, the pressure on the band brake is held high enough to hold the CRCS is place without aid from the VCR actuator.

In some examples, when in the mid load region 706, it might be more favorable to pick a middle compression setting, or select a CR setting with large amount of hysteresis around it, and leave the CRCS locked. Every time the CRCS is unlocked and the CR is moved, some amount of electrical energy is expended. Thus in some examples, the controller may opt to unlock the CRCS only if there is enough benefit such as when the energy expenditure is not greater the fuel savings at the new CR. The oil control valve does draw significantly less energy that the CR actuator motor. In other words, effectively digitizing to a plurality (e.g., 3, 4, or 5) of discreet states may be more efficient than expending energy to constantly react to a change in the desired CR setting (CRd).

It will also be appreciated that when in region 15, if the speed/load point is not changing, the brand brake may be locked by reducing the pressure in the hydraulic actuator.

Returning to FIG. 4, if at 334, the engine is determined to not be in the δ region (defined by Thr1 and Thr2), such as when the engine is in region 704 or 708 of FIG. 7, then at 336, the method includes closing the band brake by closing the oil control solenoid valve to lock the CRCS. This allows the engine to be held in the higher or lower CR setting.

If the engine is determined to be in the δ region, at 338, the method includes maintaining the oil control solenoid valve open to reduce the pressure on the brake band. The brake pressure applied by the brake band on the CRCS is then reduced so as to enable CRCS movement (if required responsive to a change in desired CR) while maintaining the CRCS in place. Specifically, the band brake may be opened to a degree where it is loose enough to enable the CRCS to move, without enabling full movement of the CRCS. This allows the CRCS to be easily moved when a change in CR is commanded, improving transient response. In one example, loosening the band brake to reduce the brake pressure on the CRCS includes adjusting a duty cycle commanded to electric actuator coupled to the band brake to move the spring of the band brake, by an amount, in the opposite direction of its biasing. The duty cycle commanded is a function of the desired degree of opening. In particular, the duty cycle commanded may be adjusted to hold the control shaft loose enough to allow a degree of motion that is higher than the degree of motion that is allowed when the control shaft is locked, but lower than the degree of motion that is allowed when the control shaft is fully unlocked. In this way, some preloading of the band is scheduled by reducing band brake friction when an imminent CR change is expected (such as responsive to a sudden high torque request). As elaborated below (at 340-342), a similar band friction adjustment may be performed when a transmission shift is imminent or during a highly dynamic drive cycle.

By reducing the band brake pressure to enable a degree of motion of the shaft that is higher than the degree of motion allowed when the shaft is fully locked, but lower than the degree of motion allowed when the shaft is fully unlocked, the shaft is primed so that it can be easily and rapidly moved via motor torque from the VCR actuator in the rapidly changing engine speed/load region when a CR change in necessitated. In addition, the controller may learn the braking force required to hold the shaft in the "loose" position as a function of engine speed/load conditions and further as a function of the current CR setting. In some example, the controller may learn the braking force as a function of control shaft position relative to the position range and the engine compression ratio. For example, the controller may increase the brake torque applied by the band brake until a position of the control shaft is outside an upper end of a permissible position range, then decrease the brake torque until the position of the control shaft is outside a lower end of the position range. In this way, the controller may learn the brake force required to hold the control shaft with a degree of motion between the upper end and the lower end of the permissible position range. Herein the position range may correspond to a threshold compression ratio range, such as the intermediate range 6 of FIG. 7. After learning the braking force as a function of control shaft position relative to the position range and the (current) engine compression ratio setting, the controller may adjust a hydraulic pressure applied on the solenoid valve coupled to the band brake based on the learning.

In some examples, the pressure applied via the oil control valve and the band brake can also be closed-loop controlled by allowing the angular movement of the CRCS at a target rate (in rad/sec). The control is achieved by the minimum power consumption balance between the band brake force and the VCR actuator motor current required to achieve the target angular acceleration and velocity.

Next, at 340, it is determined if a gear shift has been scheduled. A gear shift may be scheduled responsive to a change in torque demand. If a gear shift is scheduled, then at 342, the method includes adjusting the state of the VCR actuator and band brake based on the CR setting desired after the gear shift. The method may initiate the gear shift after locking the band brake, and then initiate VCR transition to the desired CR setting (CRd) after the transmission shift is completed. For example, if a change in CR setting is desired after the gear shift, then the band brake may be closed to lock the brake and the CRCS. Then, with the CRCS held locked, a transmission gear shift may be initiated and completed. Upon completing the transmission gear shift, the band brake may be opened and the brake pressure applied by the band brake on the CRCS may be reduced to enable the CRCS to move (with full degree of motion). Then, the VCR actuator may be actuated to transition the engine and move the CRCS to a position corresponding to the desired CR setting. Then, after the CR transition is completed, the band brake may be closed again to lock the CRCS in the current CR setting. In this way, initiation and completion of a transmission gear shift may be delayed until the band brake has been locked, and the CR transition may be delayed until the transmisison shift has been completed.

Large torque perturbations may occur during gear shifting. Since during most transient operations, the engine remains in the same (high) compression ratio, the CRCS can be held locked during the gear shift. By more reliably enabling the piston position to be determined, with respect to crank, via the locked CRCS during a gear shift, durability, efficency, and power targets are better met.

It will be appreciated that when downshifting a transmission gear to get higher power out of the engine, the CR may be reduced from high to low. This transition may happen faster if the vehicle is already at a higher engine speed to take advantage of engine torque actuation, as elaborated at FIG. 5.

If a gear shift is not scheduled, at 344, it may be determined if engine shutdown conditions have been met. In one example, engine shutdown conditions may be confirmed if torque demand is less than a threshold, if vehicle speed is less than a threshold, if a battery is sufficiently charged, and there is no demand for cabin cooling/heating. If engine shutdown conditions are not met, then at 346, the engine is maintained running. While the engine is running, the controller may continue to adjust the engine's CR setting based on the change in engine speed/load. In addition, based on the CR setting selected, the controller may adjust the brake band and the VCR actuator state to enable CRCS locking when a CR setting is to be maintained, and to enable CRCS movement when a CR setting may be changed.

If engine shutdown conditions are met, at 348 it may be determined if the engine is already in the low CR setting, such as a low setting desired at a subsequent engine restart. For example, it may be determined if the engine is already in CR 8.0. If yes, then at 356, the method includes shutting down the engine. Shutting down the engine includes disabling fuel and spark and allowing the engine to spin down to rest. In addition, the controller may disable power to the hydraulic actuator coupled to the band brake to close the band brake, which locks the CRCS and enables the engine to be shutdown in the low CR setting. Consequently, the engine can be prepositioned for starting in the low CR setting on the subsequent engine restart.

Else, if the engine is not already in the low CR setting, then at 350, it may be determined if the band brake is currently locked. If not, then at 354, the controller may keep the engine running and command the VCR actuator to the low CR setting. Herein, since the band brake is not locked (that is, it is open), the CRCS is capable of moving, and does move when the VCR actuator is powered to move the engine to the low CR setting. If the band brake is locked, then at 352, the method includes keeping the engine running and opening the band brake. Opening the band brake includes powering the actuator coupled to the band brake to force the spring in the opposite direction of the spring's default biasing. This allows the CRCS to move. The controller may then command the VCR actuator to the low CR setting desired at a subsequent engine start.

From each of 352 and 354, after transitioning the engine to the low CR setting, the method moves to 356 to shut down the engine and disable power to the hydraulic actuator coupled to the band brake to close the band brake. This locks the CRCS and enables the engine to be shutdown in the low CR setting. Consequently, the engine can be prepositioned for starting in the low CR setting on the subsequent engine restart.

Figure 5:
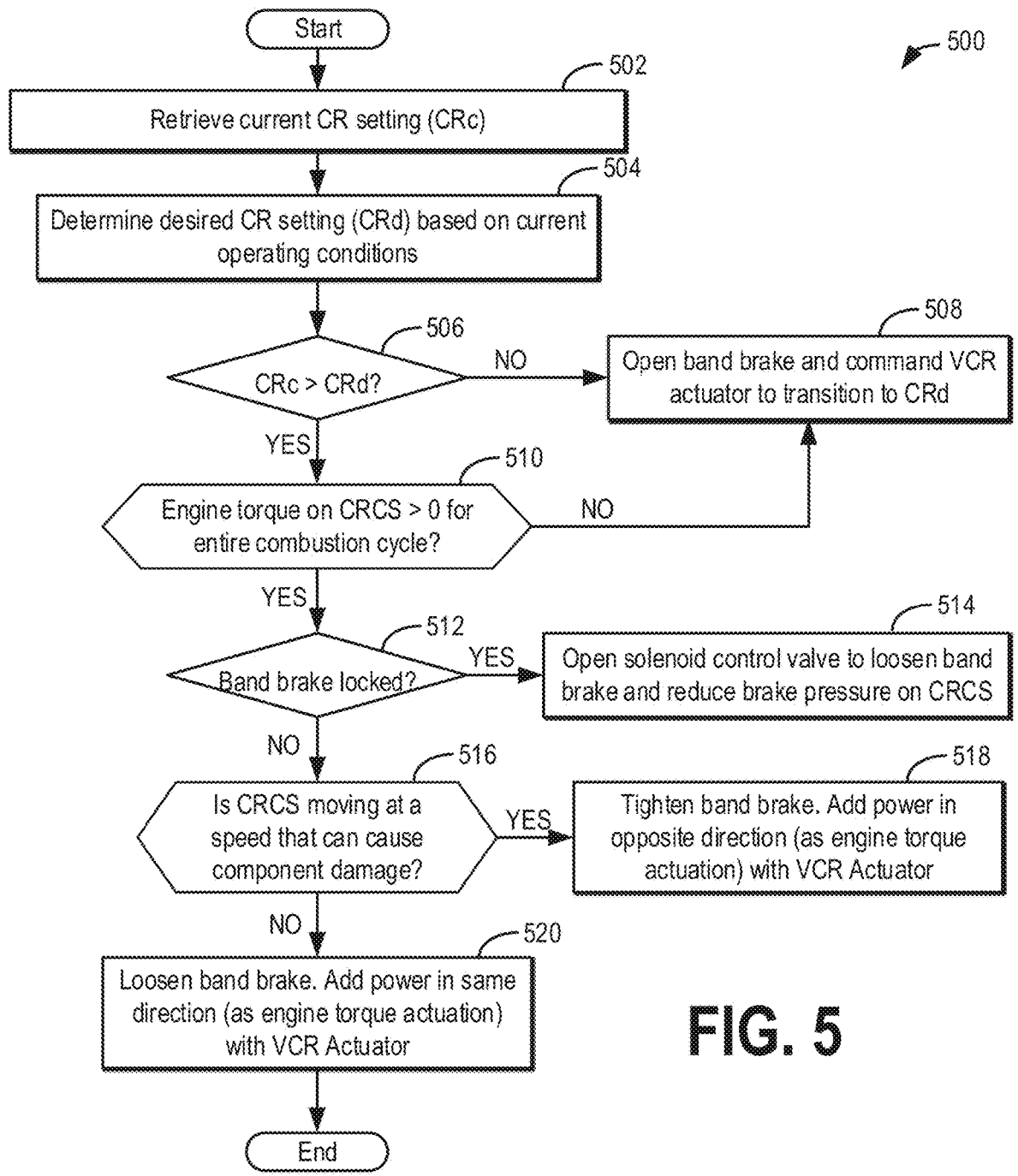
FIG. 5 shows a high level flow chart of a method for coordinating operation of the VCR actuator and braking mechanism with engine torque actuation of the compression ratio control shaft (CRCS).

Turning now to FIG. 5, an example method 500 is shown for coordinating engine torque actuation with a VCR actuator operation and band brake actuation to enable a CR transition. The method of FIG. 5 may be performed as part of the method of FIG. 3, such as at 332. The method enables a transient response time for a CR transition to be improved. At the same time, the transient response time can be balanced with CRCS hardware durability to extend component life.

The torque required to overcome the combustion forces can be calculated from the engine torque applied directly to the VCR actuator through the crankshaft, rod, mid link (e.g., midlink 206 of FIG. 2), connecting rod (such as rod 204 of FIG. 2), and eccentricity where the connecting rod attaches to the CRCS, the "s" link lever ratios, and gear set in the VCR resolver motor. Then by knowing the braking force applied from the band brake solenoid valve (such as valve 210) on the band brake, the duty cycle can be scheduled to control the torque (force) needed to over come the friction of the band clutch and move the CRCS at the angular velocity needed. With reference to map 800 of FIG. 8, the sign of the summation of torques during the combustion cycle at various CRs (as defined by the different lines in FIG. 8) may be determined. This determines the CRCS direction of movement if no other actuator or brake acted upon it. The summation allows the cand brake friction or pressure to be applied to be accurately calculated. Turning now to FIG. 5, at 502, the method includes retrieving a current CR settting (CRc) such as via a sensor coupled to the CRCS or based on engine operating conditions, as described earlier at 304. At 504, the method includes determining the desired CR setting based on engine operating conditions, as described at 320. At 506, the method includes determining if CRc is higher than CRd. If not, then at 508, the method includes opening the band brake and commanding the VCR actuator to transition the engine from CRc to CRd. Opening the band brake includes commanding a power to a hydraulic solenoid valve of the band brake to move a spring of the valve in an opposite direction to the spring's inherent biasing. Commanding the VCR actuator to enable the transition includes commanding a power to the VCR actuator to move the CRCS.

If CRc is higher than CRd, then at 510, it may be determined if the engine torque on the CRCS has been higher than a threshold (such as confirming the presence of any positive engine torque on the CRCS) for an entire combustion cycle. In one example, positive engine torque application on the CRCS may be inferred based on a speed and direction of shaft rotation. If not, the method returns to 508 to open the band brake and command the VCR actuator to transition the engine from CRc to CRd. Else, if there has been positive engine torque on the CRCS over the combustion cycle, then at 512, it may be determined if the band brake is already locked. The band brake may be locked when there is no power supplied to the hydraulic actuator of the band brake. The locked position may be default position of the band brake wherein a spring of the hydraulic actuator is biased in a direction.

If the band brake is locked, then at 514, the method includes loosening the band brake and reducing a brake pressure applied by the band brake on the CRCS. For example, the band brake may be loosened by applying power on the hydraulic actuator of the band brake to open the solenoid control valve. The band brake may be opened to a degree that allows the control shaft to move with a degree of rotation that is lower than the degree of rotation allowed when fully unlocked. The inventors herein have recognized that due to the configuration of the VCR mechanism, torque is exerted on the CRCS during combustion which naturally moves the shaft from a high CR to a low CR after it has dropped below a threshold CR. For example, engine torque may be exerted when the CR drops below a CR of 12.5. Utilizing this natural torque plus the force from the VCR actuator can increase the rotational velocity of the CRCS. This can improve the transient response time. Thus by loosening the band brake and enabling the CRCS to be moved, the engine torque can be leveraged in addition to the VCR actuator torque to rapidly transition the engine from a higher CR to a lower CR. Improving the time to reduce the compression ratio may improve vehicle response during events that require vehicle acceleration.

If the band brake is not locked, then at 516, it may be determined if the CRCS is moving at a speed that can cause component damage. For example, based on a position signal from the VCR actuator (or a signal coupled to the CRCS), the controller may calculate a velocity of motion of the control shaft. If the estimated velocity is higher than a threshold speed, then at 518, the brake pressure applied by the band brake on the CRCS can be adjusted to reduce the velocity to within a target velocity range. By reducing the velocity of the CRCS, the shaft may be protected from velocity induced damage. The angular velocity may not be as important until coming to rest at the low CR position if using the combustion forces to move to the low CR position quickly. So by measuring a rate of angular change of the CRCS (in Rad/sec), the controller can predict into the future at that rate of change when the shaft would hit the end stop, and apply the brake to slow the rate and "land it soft". As an example, the controller may tighten the band brake to reduce the speed of movement of the CRCS during the transition of the engine from the higher CR to the lower CR. This includes the controller reducing power to the hydraulic actuator of the band brake to move the spring mechanism in the direction of its default biasing. This increases a brake torque that counteracts the engine torque applied on the CRCS. In addition, the controller may power the VCR actuator to add power to the CRCS in a direction opposite to the engine torque.

If the CRCS is not moving at a higher than desired speed, then at 520, the method includes loosening the band brake to allow the CR transition at the same (or higher) velocity. This includes the controller powering the hydraulic actuator of the band brake to move the spring mechanism in the opposite direction of its default biasing. The controller may optionally also power the VCR actuator to add power the VCR actuator to add power to the CRCS in the same opposite as the engine torque.

In this way, the bank brake and the VCR actuator can work together to improve transient engine response while also reducing the likelihood of the CRCS impacting a mechanical hard stop. As a result, the component life of the VCR mechanism is extended.

It will be appreciated that the actuator coupled to the band brake may be a hydraulic actuator or an electric actuator. In either case, the actuator is coupled to a spring loaded valve and the actuator has to be powered to overcome the spring force to unlock the brake. When unpowered, the spring is biased in a default position which locks the brake. Consequently, if there is a power failure or a degradation of any component of the hydraulic or electric actuator, the brake defaults to a locked position, ensuring that the CRCS is locked in place.

The controller may learn the braking engagement and full lock positions over iterative actuation events to achieve a "smoother" landing. This enables a faster time to a fully unlocked position. By locking the CRCS in the default position, the hydraulic or electric actuator allows the VCR actuator to operate at maximum power during a CR transition phase while remaining unpowered when operating at a fixed CR, further improving fuel economy. The tip of the brake band actuator can be attached to the loose band during assembly so that the actuator is in a fully extended state. The band may lock the control shaft into place as the actuator is tightened.

In this way, a controller may maintain a position of a control shaft for varying a compression ratio of an engine via braking force from a brake; and adjust the braking force prior to and during actuation of the control shaft based on operating conditions. Herein, actuation of the control shaft includes varying the compression ratio via a variable compression ratio (VCR) actuator coupled to the control shaft, and wherein the position of the control shaft is not maintained via torque from the VCR actuator. The controller may also actuate the control shaft responsive to an upcoming transmission shift, a transmission shift schedule adjusted based on the braking force. Therein, the controller may reduce the braking force prior to actuation of the control shaft, and vary the braking force while actuating the control shaft, the varying based on a first compression ratio before the actuation of the control shaft relative to a second compression ratio after the actuation of the control shaft. In one example, when the first compression ratio is higher than an upper threshold or lower than a lower threshold, and the second compression ratio is in between the upper and the lower threshold, the varying includes decreasing the braking force as the compression ratio moves from the first compression ratio to the second compression ratio. In another example, when the first compression ratio is higher than the second compression ratio, the varying includes increasing the braking force as one or more of an engine torque and a motor torque from the VCR actuator on the control shaft increases, the braking force increased to transition from the first compression ratio to the second compression ratio at a target speed, the target speed selected as a function of a hardware limit of the control shaft. The brake may be coupled to a spring loaded valve, and adjusting the braking force may include reducing the braking force by increasing a pressure applied on a spring of the spring loaded valve, opposite to a direction of spring biasing; and raising the braking force by decreasing the pressure applied on the spring. The pressure may be applied hydraulically by a hydraulic actuator or electrically via an electric actuator, as described at FIGS. 6A-6B. Actuation of the control shaft may include transitioning the engine from a first compression ratio setting to a second compression ratio setting. The adjusting may include, during a first condition, decreasing the braking force prior to the actuation of the control shaft and then increasing the braking force to hold the engine in the second compression ratio setting while enabling a lower degree of control shaft motion; and during a second condition, decreasing the braking force prior to the actuation of the control shaft and then increasing the braking force to hold the engine in the second compression ratio setting while enabling a higher degree of control shaft motion. For example, during the first condition, the second compression ratio setting may correspond to a region of lower rate of change of engine speed and load, while during the second condition, the second compression ratio setting may correspond to a region of higher rate of change of engine speed and load.

Figure 6A:
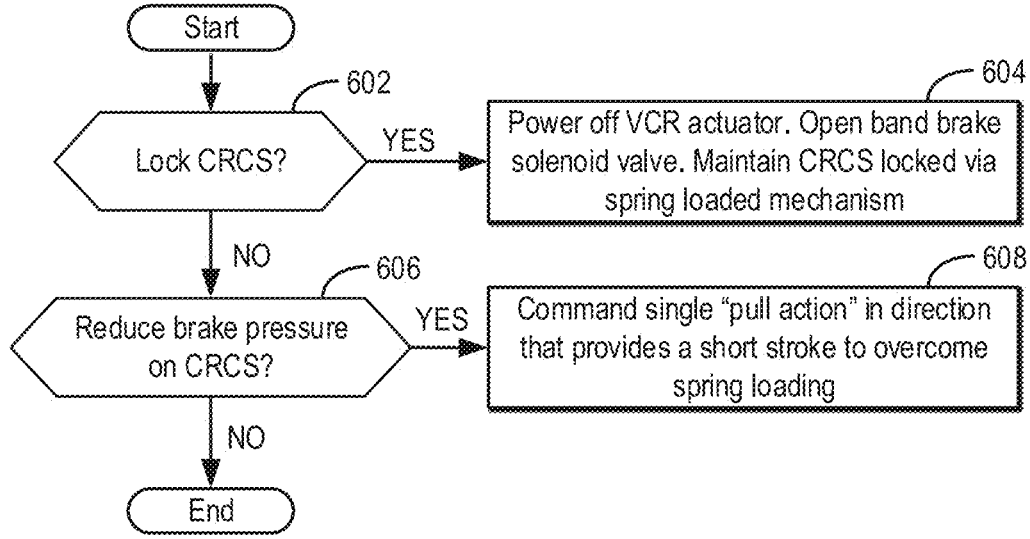
FIGS. 6A-6B depict example embodiments of an actuator for operating the control shaft braking mechanism.
Figure 6B:
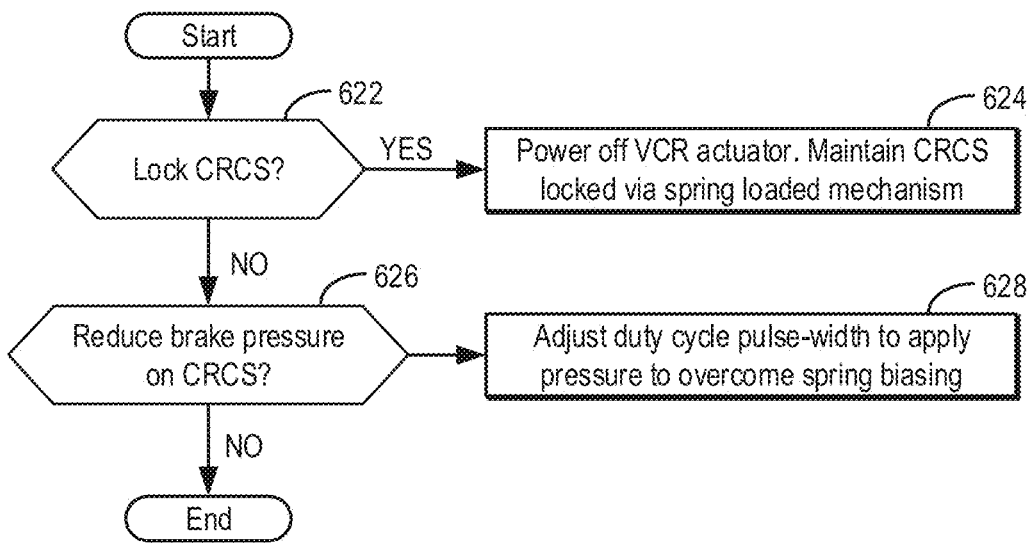

FIGS. 6A-6B detail actuation of the band brake via a hydraulic actuator (method 600 of FIG. 6A) and via an electric actuator (method 620 of FIG. 6B).

Turning first to method 600 of FIG. 6A, hydraulic actuation of the band brake during a VCR operation is detailed. The hydraulic actuator of the band brake may be bolted to the side of the engine or oil pan, with the oil seal kept intact with a gasket.

At 602, the method determines if the CRCS is to be locked. As discussed earlier, the CRCS may be locked when the engine is to be operated in a fixed CR setting, which may be a highest possible or a lowest possible CR setting of the VCR mechanism. In addition, the CRCS may be locked when the engine is in a speed-load region where the engine speed and load does not change rapidly, such as when the engine is outside region δ of FIG. 7. If the CRCS is to be locked, then at 604, the method includes disabling power to the VCR actuator while opening the band brake solenoid valve. Once the band brake solenoid valve is open, the CRCS is maintained locked the via spring loaded mechanism of the solenoid valve. Post power off, the solenoid valve opens, locking the mechanism in place independent of hydraulic fluid (e.g., oil) temperature and hydraulic fluid level.

If the CRCS is already locked (and therefore does not need to be locked), then at 606, it is determined if the brake pressure applied by the brake band on the CRCS needs to be reduced. If yes, then at 608, the method includes commanding a single "pull action" via the actuator in a first direction (opposite the direction of spring bias) to provide a short stroke that overcomes the spring loading. The short stroke allows for a low profile in the opposite direction for smaller packaging and usage of less hydraulic volume.

Turning now to method 620 of FIG. 6B, electric actuation of the band brake during a VCR operation is detailed. The electric actuator of the band brake may be coupled to the same location of the engine as an AC or DC motor with integrated or outside control attached to either a work gear with no spring or a spring loaded general mechanism (like what is used for hydraulic actuation).

At 622, as at 602, the method determines if the CRCS is to be locked. As discussed earlier, the CRCS may be locked when the engine is to be operated in a fixed CR setting, which may be a highest possible or a lowest possible CR setting of the VCR mechanism. In addition, the CRCS may be locked when the engine is in a speed-load region where the engine speed and load does not change rapidly, such as when the engine is outside region δ of FIG. 7. If the CRCS is to be locked, then at 624, the method includes disabling power to the VCR actuator while opening the band brake solenoid valve. Once the band brake solenoid valve is open, the CRCS is maintained locked the via spring loaded mechanism of the solenoid valve. Post power off, the solenoid valve opens, locking the mechanism in place.

If the CRCS is already locked (and therefore does not need to be locked), then at 626, it is determined if the brake pressure applied by the brake band on the CRCS needs to be reduced. If yes, then at 628, the method includes applying a voltage to move the spring loaded mechanism in a first direction (opposite the direction of spring bias) to provide a short stroke that overcomes the spring loading.

Table 900 of FIG. 9 tabulates the position of the various mechanisms and actuators during a variety of engine operating conditions.

It will be appreciated that FIG. 9 shows that for engine idle conditions, typically the CRCS is locked, since little to no movement is expected at idle (and the high CR setting being the most efficient setting). However, under some conditions the CRCS may be unlocked, such as during small engine displacement at high temperature with high accessory loading (e.g., with AC on, and high output from the alternator).

Turning now to FIG. 10, an example VCR adjustment is shown for a vehicle having a VCR engine. Map 1000 depicts changes in engine speed, indicative of a change in torque demand, at plot 1002. Based at least on the engine speed and load, a desired CR setting of the engine, shown at plot 1004, may be changed. For example, the CR setting may be varied between a low, mid, and high CR setting. In one non-limiting exmaple, these may include CR 8, 11, and 14, respectively. CR setting adjustments may be enabled via electrical actuation of a VCR actuator (plot 1010) as well as the state of a band brake (plot 1006) coupled to a control shaft (CRCS) of the VCR mechanism. A degree and rate of rotation of the CRCS may be varied during CR transitions by varying a hydraulic pressure applied on a spring loaded actuator of the band brake, which varies a degree of locking of the band brake, as depicted at plot 1008. The adjustments may be coordinated with a transmission gear shift schedule (plot 1012) to enable a smoother transition. Engine load is shown at plot 1014. Engine speed (plot 1002) and load (plot 1014) adjustments may be coordinated as driver demand changes during vehicle propulsion.

Prior to t1, the engine is shutdown. Herein, the engine may have been shutdown in the low CR setting. At t1, responsive to an increase in operator torque demand, the engine is restarted and engine speed starts to increase. Since the engine was shutdown in the low CR setting desirable for restarting the engine, the engine is able to restart without requiring power to be provided to the VCR actuator and with the CRCS held fixed via locking of the band brake. Since the closed or locked position of the band brake is the default position, no hydraulic pressure is required to be applied on the spring of the solenoid valve actuating the band brake.

After the engine is started and cranked at t1, the engine moves to an idling speed and stays at the idle speed. At t2, since the engine remains in the idling condition, the low CR setting is maintained without needing to actuate the VCR actuator. In alternate examples, such as when the catalyst is fully warm, the engine may be idled in the high CR setting. Therein the band brake may be transiently unlocked and the VCR actuator may be actuated to move the engine from the low CR setting to the high CR setting, and then the band brake may be relocked and the engine may be held idling in the high CR setting with the CRCS locked, as shown at dashed segments 1003, 1007, 1011, and 1009.

In the present example, in anticipation of a sudden change in engine speed and load, and consequently a chance in CR, the band brake in partially unlocked by applying a pressure on the spring to move the spring in a direction opposite to its biasing. This reduces the brake pressure applied by the band brake on the control shaft to a level where the shaft can move to a degree, without being able to move freely. At the same time, the current low CR setting can be maintained without needing motor torque to be applied by the VCR actuator. To reduce the effect of the idle combustion varaibility on the VCR actuator, the CRCS is held in place and the low CR setting is kept fixed by continuing to hold the brake band partially locked.

At t3, responsive to a change in operator torque demand (such as a tip in to request additional torque), there is a change in engine speed (the engine speed increases as the vehicle accelerates) and load requiring a CR transition to a high CR setting. To enable the transition, before powering the VCR actuator to enable the transition, the brake pressure applied by the band brake on the CRCS is reduced by increasing the pressure on the spring, moving the band brake to the fully unlocked position. Now that the CRCS can move, the VCR actuator is powered for a duration to apply motor torque on the CRCS to move the engine to the high CR setting. Once the transition is completed, the CRCS is locked in the high CR setting by reducing the pressure applied on the spring, which locks the band brake (in its default position). In addition, power to the VCR actuator is disabled. Thereafter, between t4 and t5, the engine is held in the high CR setting via the band brake.

At t5, there is a change in engine operating conditions requiring a transition to the mid CR setting. To enable the transition, the band brake is first unlocked, allowing the CRCS to move. The VCR actuator is powered transiently to apply torque on the CRCS and move it to a position corresponding to the desired CR setting. As the CR transitions between t5 and t6 to the mid CR setting (which in region δ where there may be a higher rate of change in engine speed and load) where CR transitions can suddenly occur, the CRCS is moved to from the fully unlocked state to a partially locked state by reducing the pressure on the spring. The pressure may be reduced as the CR moves from the high CR setting towards the mid CR setting. Once the desired CR setting is reached, the VCR actuator is disabled.

While in this CR setting, between t6 and t7, the band brake is held partially locked, and the CRCS is held loose enough to enable a VCR actuator torque to move the CRCS again if required, without requiring the VCR actuator torque to hold the CRCS in its current place. It will be appreciated that while the example shows the pressure on the spring holding steady between t6 and t7, this may be reflective of an average pressure. The controller may continually make changes to the pressure applied on the spring to vary the brake torque applied by the band brake on the CRCS. The resulting loosening of the CRCS may result in a small degree of CRCS motion which can cause the CR setting to drift from the desired setting, and the CRCS position to drift from the desired position (corresponding to the selected CR setting). For example, spring pressure may be applied and brake torque reduced till CRCS motion in a first direction is noticed. In response to the detected motion, spring pressure may be reduced and brake torque increased till CRCS motion in a second, opposite direction is noticed. In response to the detected motion, brake torque may again be reduced. In this way, the CRCS may be moved by a small degree continusouly such that the CR setting is held, on average, at the desired setting without requiring motor torque from the VCR actuator. At the same time, the CRCS is loose enough that it can be moved as soon as motor torque is applied on it via the VCR actuator.

As an example, for all of the modes where the band brake is held loose, the controller may refer to a mapped value of a minimum CR change needed to actuate (loosen) the band. As the oil solenoid consumes electrical energy, the controller may lock the band brake in fixed discrete CR levels (e.g., of 1 CR point) because more energy is spent in keeping the solenoid open and the band loose than responding to CR changes of less than 1 CR point.

As another example, the controller may continuously vary the brake torque by increasing the braking force applied by the band brake until the control shaft moves in a first direction outside a permissible position range of the CRCS (while at the mid CR setting). Responsive to the movement, the controller may immediately decrease the braking force until the control shaft moves in a second, opposite direction outside the position range. Herein the position range may be based on the current CR setting or a permissible threshold compression ratio range where the CRCS is to be held at a setting with some degree of rotation enabled.

At t7, there is another change in engine operating conditions requiring a reduction in CR. In addition, up until t7, the transmission was in a first gear. The change in engine operating conditions may also require a transmission shift to a second gear, different from the first gear. In one example, the transmission shift requested is an upshift (as depicted herein). In another example, the transmission shift requested may be a downshift. In either case, initiation of the transmission shift is delayed until the band brake is locked. Specifically, at t7, the pressure on the spring is reduced to return the band brake to the default closed (closed) position. Then, while holding the band brake locked, the transmisison gear shift is initiated and completed by t8. At t8, the requested CR transition is initiated. Since the desired CR is now lower than the current CR, at least some engine combustion torque experienced on the CRCS due to cylinder combustion may be used to move the CRCS in the direction of the lower CR setting. This engine torque application is coordinated with VCR torque and band brake torque application to enable the transition to occur at a desired rate, and not faster (as may have occurred if no band brake torque had been applied). In particular, a ratio of brake torque applied via the the band brake on the CRCS relative to motor torque applied on the CRCS via the VCR actuator is adjusted as a function of the engine torque to enable the transition from the mid CR setting to the low CR setting at the target rate. Specifically, the VCR actuator is powered to apply motor torque on the shaft. As the motor torque increases, and since engine torque is also concurrently being applied on the shaft in the same direction as the motor torque (to move the shaft in the direction of the lower CR setting), the brake torque applied by the brake band on the shaft is increased by reducing the pressure on the spring. This allows the CR transition to occur gradually. Else, in the absence on the brake torque, the transition may have occurred faster, as indicated by dashed segment 1005, and this may have led to hardware durability issues.

Once the transition to the lower CR setting is completed, the CRCS is locked by reducing the pressure on the spring to close and lock the band brake, and power to the VCR actuator is disabled. Thereafter, the engine is held in the lower CR setting via the locked band brake.

At t9, there is another change in engine operating conditions requiring a transition to the high CR setting and another transmisison shift, herein a downshift. Since the band brake is already locked, the transmission shift is initiated immediately. Then, after completing the transmission shift, the CR transition is initiated. To enable the transition, before powering the VCR actuator to enable the transition, the brake pressure applied by the band brake on the CRCS is reduced by increasing the pressure on the spring, moving the band brake to the fully unlocked position. Now that the CRCS can move, the VCR actuator is powered for a duration to apply motor torque on the CRCS to move the engine to the high CR setting. Once the transition is completed, the CRCS is locked in the high CR setting by reducing the pressure applied on the spring, which locks the band brake (in its default position). In addition, power to the VCR actuator is disabled. Thereafter the engine is held in the high CR setting via the band brake while the transmission is also head in the higher gear. In this way, responsive to a change in engine operating conditions necessitating a change in engine compression ratio and a transmission gearshift, the controller may increase the braking force to lock the brake before initiating the transmission gearshift. Then, after completing the transmission gearshift, the controller may reduce the braking force on the control shaft from the brake while increasing the motor torque on the control shaft from the electric compression ratio actuator to move the control shaft to a position corresponding to the change in engine compression ratio.

At t10, engine idle-stop conditions are met and an engine shutdown is requested. Since it is desirable for the engine to be restarted during the subsequent restart at the low CR setting (as during the engine restart at t1), a transition from the high CR setting to the low CR setting is effected before the engine is actually shutdown. In other words, the shutdown is delayed until a CR transition is completed. In particular, before powering the VCR actuator to enable the transition, the brake pressure applied by the band brake on the CRCS is reduced by increasing the pressure on the spring, moving the band brake to the fully unlocked position. Now that the CRCS can move, the VCR actuator is powered for a duration to apply motor torque on the CRCS to move the engine to the low CR setting. Once the transition is completed, the CRCS is locked in the low CR setting by reducing the pressure applied on the spring, which locks the band brake (in its default position). Upon completing the CR transition, at t11, the engine is shutdown by disabling fuel and spark to engine cylinders, which causes the engine to spin down to rest while the CR is held at the low CR setting by the locked band brake. Consequently, when the engine is restarted after t11, the engine can be restarted in the low CR setting, improving engine restartability.

In this way, during a first condition, when outside a threshold compression ratio range, a controller may maintain a fixed position of a control shaft that varies a compression ratio of an engine via braking force from a brake. In comparison, during a second condition, when inside the threshold compression ratio range, the controller may continuously varying a position of the control shaft within a position range via the braking force. In one example, during the first condition, the compression ratio of the engine is higher than an upper threshold or lower than a lower threshold, and during the second condition, the compression ratio of the engine is lower than the upper threshold and higher than the lower threshold. The continuously varying may include increasing the braking force until the control shaft moves in a first direction outside the position range, and responsive to the movement, decreasing the braking force until the control shaft moves in a second, opposite direction outside the position range, the position range based on the threshold compression ratio range. Further, during the second condition, the controller may learn the braking force as a function of control shaft position relative to the position range and the engine compression ratio; and adjust a hydraulic pressure applied on a solenoid valve coupled to the brake based on the learning. In a further example, during the first condition, an electric compression ratio actuator coupled to the control shaft may be disabled and motor torque may not be applied on the control shaft via the actuator. In comparison, during the second condition, the electric compression ratio actuator coupled to the control shaft may be enabled and at least some motor torque may also be applied on the control shaft via the actuator. Further, during both the first and the second condition, responsive to a change in engine operating conditions necessitating a change in engine compression ratio and a transmission gearshift, the controller may reduce the braking force on the control shaft from the brake while increasing the motor torque on the control shaft from the electric compression ratio actuator to move the control shaft to a position corresponding to the change in engine compression ratio, and then increase the braking force to maintain the fixed position of the control shaft before initiating the transmission gearshift. If the change in engine compression ratio includes a decrease in compression ratio, the controller may also adjust the ratio of braking force from the brake and motor torque from the electric compression ratio actuator on the control shaft based on an engine torque applied on the control shaft, via a piston due to cylinder combustion, to transition the control shaft through the decrease in compression ratio at a target velocity.

In this way, a fixed CR setting may be maintained while reducing power consumption at a VCR actuator. By varying a brake torque applied on a control shaft of a VCR engine via a band brake, a compression ratio control shaft can be held loose enough to transition to a desired CR setting during transient torque demand. At the same time, the control shaft may be held tight enough to hold a current CR setting. By loosening the control shaft via the band brake when operating in engine speed-load regions where a sudden change in CR is expected, transient response time is improved. By tightening the control shaft via the band brake when a sudden change in CR is not expected, power may be disabled to a VCR actuator, while enabling a more accurate estimation of a piston position. In addition, a position of the control shaft can be used to calculate the velocity of motion of the control shaft, allowing for finer control of CR transition rates. By coordinating torque applied via the band brake and the VCR actuator on the control shaft with engine torque inherently applied on the control shaft during a shift to a lower compression ratio, the CR shift can be achieved at a speed that does not cause hardware issues while still providing a desired transition response time. By also coordinating the adjustments with a transmission shift schedule, a smoother transmission shift may be enabled. By improving CR transitions while reducing power consumption, performance and fuel efficiency of a VCR engine can be improved.

One example method for an engine comprises maintaining a position of a control shaft for varying a compression ratio of an engine via braking force from a brake; and adjusting the braking force prior to and during actuation of the control shaft based on operating conditions. In the preceding example, additionally or optionally, actuation of the control shaft includes varying the compression ratio via a variable compression ratio (VCR) actuator coupled to the control shaft, and wherein the position of the control shaft is not maintained via torque from the VCR actuator. In any or all of the preceding examples, additionally or optionally, the method further comprises actuating the control shaft responsive to an upcoming transmission shift, a transmission shift schedule adjusted based on the braking force. In any or all of the preceding examples, additionally or optionally, the adjusting includes reducing the braking force prior to actuation of the control shaft, and varying the braking force while actuating the control shaft, the varying based on a first compression ratio before the actuation of the control shaft relative to a second compression ratio after the actuation of the control shaft. In any or all of the preceding examples, additionally or optionally, when the first compression ratio is higher than an upper threshold or lower than a lower threshold, and the second compression ratio is in between the upper and the lower threshold, the varying includes decreasing the braking force as the compression ratio moves from the first compression ratio to the second compression ratio. In any or all of the preceding examples, additionally or optionally, when the first compression ratio is higher than the second compression ratio, the varying includes increasing the braking force as one or more of an engine torque and a motor torque from the VCR actuator on the control shaft increases, the braking force increased to transition from the first compression ratio to the second compression ratio at a target speed, the target speed selected as a function of a hardware limit of the control shaft. In any or all of the preceding examples, additionally or optionally, the brake is coupled to a spring loaded valve, and wherein adjusting the braking force includes: reducing the braking force by increasing a pressure applied on a spring of the spring loaded valve, opposite to a direction of spring biasing; and raising the braking force by decreasing the pressure applied on the spring. In any or all of the preceding examples, additionally or optionally, the actuation of the control shaft includes transitioning the engine from a first compression ratio setting to a second compression ratio setting, and wherein the adjusting includes: during a first condition, decreasing the braking force prior to the actuation of the control shaft and then increasing the braking force to hold the engine in the second compression ratio setting while enabling a lower degree of control shaft motion; and during a second condition, decreasing the braking force prior to the actuation of the control shaft and then increasing the braking force to hold the engine in the second compression ratio setting while enabling a higher degree of control shaft motion. In any or all of the preceding examples, additionally or optionally, during the first condition, the second compression ratio setting corresponds to a region of lower rate of change of engine speed and load, and wherein during the second condition, the second compression ratio setting corresponds to a region of higher rate of change of engine speed and load.

Another example method for an engine comprises: during a first condition, when outside a threshold compression ratio range, maintaining a fixed position of a control shaft that varies a compression ratio of an engine via braking force from a brake; and during a second condition, when inside the threshold compression ratio range, continuously varying a position of the control shaft within a position range via the braking force. In any or all of the preceding examples, additionally or optionally, during the first condition, the compression ratio of the engine is higher than an upper threshold or lower than a lower threshold, and wherein during the second condition, the compression ratio of the engine is lower than the upper threshold and higher than the lower threshold. In any or all of the preceding examples, additionally or optionally, the continuously varying includes increasing the braking force until the control shaft moves in a first direction outside the position range, and responsive to the movement, decreasing the braking force until the control shaft moves in a second, opposite direction outside the position range, the position range based on the threshold compression ratio range. In any or all of the preceding examples, additionally or optionally, the method further comprises, during the second condition, learning the braking force as a function of control shaft position relative to the position range and the engine compression ratio; and adjusting a hydraulic pressure applied on a solenoid valve coupled to the brake based on the learning. In any or all of the preceding examples, additionally or optionally, during the first condition, an electric compression ratio actuator coupled to the control shaft is disabled and motor torque is not applied on the control shaft via the actuator, and wherein during the second condition, the electric compression ratio actuator coupled to the control shaft is enabled and at least some motor torque is also applied on the control shaft via the actuator. In any or all of the preceding examples, additionally or optionally, the method further comprises during both the first and the second condition, responsive to a change in engine operating conditions necessitating a change in engine compression ratio and a transmission gearshift, increasing the braking force to lock the brake before initiating the transmission gearshift, and then reducing the braking force on the control shaft from the brake while increasing the motor torque on the control shaft from the electric compression ratio actuator to move the control shaft to a position corresponding to the change in engine compression ratio, after completing the transmission gearshif. In any or all of the preceding examples, additionally or optionally, when the change in engine compression ratio includes a decrease in compression ratio, adjusting the ratio of braking force from the brake and motor torque from the electric compression ratio actuator on the control shaft based on an engine torque applied on the control shaft, via a piston due to cylinder combustion, to transition the control shaft through the decrease in compression ratio at a target velocity.

Another example engine system comprises: an engine; a control shaft for varying a compression ratio of the engine; a brake for applying a brake torque on the control shaft, the brake actuated via a spring-loaded solenoid valve; an electrical actuator for applying a motor torque on the control shaft; a transmission including a plurality of gears; and a controller storing executable instructions in non-transitory memory that, when executed, cause the controller to: maintaining the control shaft in a fixed position via the brake to maintain a first compression ratio setting of the engine; and responsive to a request to transition the engine to a second compression ratio setting, lower than the first setting, adjusting a ratio of the brake torque from the brake and the motor torque from the electrical actuator on the control shaft as a function of engine torque applied on the control shaft due to cylinder combustion. In any or all of the preceding examples, additionally or optionally, the controller includes further instructions that cause the controller to: after transitioning to the second compression ratio setting, increasing the brake torque while reducing the motor torque to maintain a position of the control shaft; and then initiating a transmission gearshift. In any or all of the preceding examples, additionally or optionally, when the second compression ratio setting is within a threshold compression ratio range corresponding to a higher rate of change of engine speed or load, increasing the brake torque includes increasing the brake torque to enable a first degree of control shaft motion, and when the second compression ratio setting is outside the threshold compression ratio range, increasing the brake torque includes increasing the brake torque to enable a second degree of control shaft motion, smaller than the first degree. In any or all of the preceding examples, additionally or optionally, enabling the first degree of control shaft motion includes increasing the brake torque until a position of the control shaft is outside an upper end of a position range corresponding to the threshold range, then decreasing the brake torque until the position of the control shaft is outside a lower end of the position range.

In a further representation, a method includes delaying a transmission shift until a compression ratio control shaft has been locked via braking force applied by a brake. In the preceding example, additionally or optionally, the method further comprises initating a compression ratio setting transition via an electrical VCR actuator after completing the transmission shift, the initiating the VCR transition including unlocking the brake after the transmisison shift and before actuating the VCR actuator. In any or all of the preceding examples, additionally or optionally, the method further comprises disabling power to an electrical VCR actuator actuating the shaft before and during the transmission shift. In any or all of the preceding examples, additionally or optionally, the method further comprises locking the control shaft after actuating the control shaft via motor torque from a VCR actuator to enable an engine CR transition. In any or all of the preceding examples, additionally or optionally, the method further comprises unlocking the control shaft by reducing the braking force before the engine CR transition.

In another further representation, a method includes maintaining a first degree of rotation of a control shaft for varying an engine compression ratio while holding the engine compression ratio fixed via a ratio of brake torque from a brake and motor torque from a VCR actuator. In the preceding example, additionally or optionally, the method further comprises maintaining a second, lower degree of rotation of the control shaft while holding the engine compression ratio fixed via brake torque from the brake and without motor torque from the VCR actuator. In any or all of the preceding examples, additionally or optionally, the fixed engine compression ratio applied when maintaining the first degree of rotation of the shaft is lower than an upper threshold or higher than a lower threshold, and the fixed engine compression ratio applied when maintaining the second degree of rotation of the shaft is higher than the upper threshold or lower than the lower threshold. In any or all of the preceding examples, additionally or optionally, the fixed engine compression ratio applied when maintaining the first degree of rotation of the shaft corresponds to a higher rate of change in engine speed and load, and the fixed engine compression ratio applied when maintaining the second degree of rotation of the shaft corresponds to a lower rate of change in engine speed and load.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims shall be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   maintaining a position of a control shaft for varying a compression ratio of an engine via braking force from a brake;
   adjusting the braking force prior to and during actuation of the control shaft based on operating conditions; and
   actuating the control shaft responsive to an upcoming transmission shift, a transmission shift schedule adjusted based on the braking force.

2. The method of claim 1, wherein actuation of the control shaft includes varying the compression ratio via a variable compression ratio (VCR) actuator coupled to the control shaft, and wherein the position of the control shaft is not maintained via torque from the VCR actuator.

3. The method of claim 1, wherein the adjusting includes reducing the braking force prior to actuation of the control shaft, and varying the braking force while actuating the control shaft, the varying based on a first compression ratio before the actuation of the control shaft relative to a second compression ratio after the actuation of the control shaft.

4. The method of claim 3, wherein when the first compression ratio is higher than an upper threshold or lower than a lower threshold, and the second compression ratio is in between the upper and the lower threshold, the varying includes decreasing the braking force as the compression ratio moves from the first compression ratio to the second compression ratio.

5. The method of claim 3, wherein when the first compression ratio is higher than the second compression ratio, the varying includes increasing the braking force as one or more of an engine torque and a motor torque from the VCR actuator on the control shaft increases, the braking force increased to transition from the first compression ratio to the second compression ratio at a target speed, the target speed selected as a function of a hardware limit of the control shaft.

6. The method of claim 1, wherein the brake is coupled to a spring loaded valve, and wherein adjusting the braking force includes:
reducing the braking force by increasing a pressure applied on a spring of the spring loaded valve, opposite to a direction of spring biasing; and
raising the braking force by decreasing the pressure applied on the spring.

7. The method of claim 1, wherein the actuation of the control shaft includes transitioning the engine from a first compression ratio setting to a second compression ratio setting, and wherein the adjusting includes:
during a first condition, decreasing the braking force prior to the actuation of the control shaft and then increasing the braking force to hold the engine in the second compression ratio setting while enabling a lower degree of control shaft motion; and
during a second condition, decreasing the braking force prior to the actuation of the control shaft and then increasing the braking force to hold the engine in the second compression ratio setting while enabling a higher degree of control shaft motion.

8. The method of claim 7, wherein during the first condition, the second compression ratio setting corresponds to a region of lower rate of change of engine speed and load, and wherein during the second condition, the second compression ratio setting corresponds to a region of higher rate of change of engine speed and load.

9. A method for an engine, comprising:
during a first condition, when outside a threshold compression ratio range, maintaining a fixed position of a control shaft that varies a compression ratio of an engine via braking force from a brake; and
during a second condition, when inside the threshold compression ratio range, continuously varying a position of the control shaft within a position range via the braking force.

10. The method of claim 9, wherein during the first condition, the compression ratio of the engine is higher than an upper threshold or lower than a lower threshold, and wherein during the second condition, the compression ratio of the engine is lower than the upper threshold and higher than the lower threshold.

11. The method of claim 9, wherein the continuously varying includes increasing the braking force until the control shaft is outside the position range in a first direction, and responsive to the control shaft being outside the position range, decreasing the braking force until the control shaft is outside the position range in a second, opposite direction, the position range based on the threshold compression ratio range.

12. The method of claim 11, further comprising, during the second condition, learning the braking force as a function of control shaft position relative to the position range and the engine compression ratio via the continuously varying; and adjusting a hydraulic pressure applied on a solenoid valve coupled to the brake based on the learning.

13. The method of claim 9, wherein during the first condition, an electric compression ratio actuator coupled to the control shaft is disabled and motor torque is not applied on the control shaft via the actuator, and wherein during the second condition, the electric compression ratio actuator coupled to the control shaft is enabled and at least some motor torque is also applied on the control shaft via the actuator.

14. The method of claim 13, further comprising, during both the first and the second condition, responsive to a change in engine operating conditions necessitating a change in engine compression ratio and a transmission gearshift, increasing the braking force to lock the brake before initiating the transmission gearshift, and then reducing the braking force on the control shaft from the brake while increasing the motor torque on the control shaft from the electric compression ratio actuator to move the control shaft to a position corresponding to the change in engine compression ratio, after completing the transmission gearshift.

15. The method of claim 13, wherein when the change in engine compression ratio includes a decrease in compression ratio, adjusting a ratio of braking force from the brake and motor torque from the electric compression ratio actuator on the control shaft based on an engine torque applied on the control shaft, via a piston due to cylinder combustion, to transition the control shaft through the decrease in compression ratio at a target velocity.

16. An engine system, comprising:
an engine;
a control shaft for varying a compression ratio of the engine;
a brake for applying a brake torque on the control shaft, the brake actuated via a spring-loaded solenoid valve;
an electrical actuator for applying a motor torque on the control shaft;
a transmission including a plurality of gears; and
a controller storing executable instructions in non-transitory memory that, when executed, cause the controller to:
maintain the control shaft in a fixed position via the brake to maintain a first compression ratio setting of the engine;
responsive to a request to transition the engine to a second compression ratio setting, lower than the first setting; and
adjust a ratio of the brake torque from the brake and the motor torque from the electrical actuator on the control shaft as a function of engine torque applied on the control shaft due to cylinder combustion.

17. The system of claim 16, wherein the controller includes further instructions that cause the controller to:
after transitioning to the second compression ratio setting, increase the brake torque while reducing the motor torque to maintain a position of the control shaft; and
then initiate a transmission gearshift.

18. The system of claim 17, wherein when the second compression ratio setting is within a threshold compression ratio range corresponding to a higher rate of change of engine speed or load, increasing the brake torque includes increasing the brake torque to enable a first degree of control shaft motion, and when the second compression ratio setting is outside the threshold compression ratio range, increasing the brake torque includes increasing the brake torque to enable a second degree of control shaft motion, smaller than the first degree.

19. The system of claim 18, wherein enabling the first degree of control shaft motion includes increasing the brake torque until a position of the control shaft is outside an upper end of a position range corresponding to the threshold compression ratio range range, then decreasing the brake torque until the position of the control shaft is outside a lower end of the position range.

* * * * *